(12) United States Patent
Ito et al.

(10) Patent No.: US 8,238,057 B2
(45) Date of Patent: Aug. 7, 2012

(54) MAGNETIC HEAD, HEAD ASSEMBLY AND MAGNETIC RECORDING/REPRODUCING APPARATUS AND METHOD FOR MANUFACTURING MAGNETIC HEAD

(75) Inventors: Yuji Ito, Tokyo (JP); Seiji Yari, Tokyo (JP)

(73) Assignee: TDK Corporation, Tokyo (JP)

(*) Notice: Subject to any disclaimer, the term of this patent is extended or adjusted under 35 U.S.C. 154(b) by 660 days.

(21) Appl. No.: 12/388,923

(22) Filed: Feb. 19, 2009

(65) Prior Publication Data

US 2010/0208388 A1 Aug. 19, 2010

(51) Int. Cl.
  *G11B 5/31* (2006.01)
  *G11B 5/127* (2006.01)
  *H01L 43/12* (2006.01)

(52) U.S. Cl. ......... 360/123.06; 360/123.09; 360/123.11; 360/123.12; 360/123.25; 360/123.37; 360/123.4; 360/123.46; 204/192.2; 29/603.07

(58) Field of Classification Search .................. None
See application file for complete search history.

(56) References Cited

U.S. PATENT DOCUMENTS

| | | | | |
|---|---|---|---|---|
| 6,661,605 B1* | 12/2003 | Pust et al. | ........ | 360/125.71 |
| 6,747,841 B1* | 6/2004 | Olim et al. | ........ | 360/125.39 |
| 6,836,956 B2* | 1/2005 | Sasaki | ........ | 29/603.15 |
| 6,954,340 B2 | 10/2005 | Shukh et al. | | |
| 7,142,391 B2* | 11/2006 | Ohtomo et al. | ........ | 360/125.51 |
| 2002/0024776 A1* | 2/2002 | Sasaki et al. | ........ | 360/317 |
| 2005/0047011 A1* | 3/2005 | Han et al. | ........ | 360/126 |

FOREIGN PATENT DOCUMENTS

| | | |
|---|---|---|
| JP | 4-79007 | 3/1992 |
| JP | 5-73728 | 10/1993 |
| JP | 3368247 | 11/2002 |

* cited by examiner

*Primary Examiner* — Kevin Bernatz
(74) *Attorney, Agent, or Firm* — Oblon, Spivak, McClelland, Maier & Neustadt, L.L.P.

(57) ABSTRACT

The present invention relates to a magnetic head and particularly to improvement of its recording element. The recording element includes a first magnetic film, a second magnetic film, a coil film, and an insulating film. The first magnetic film has a first pole portion. The second magnetic film has a second pole portion opposed to the first pole portion with a magnetic gap film therebetween and is joined to the first magnetic film at a back gap portion that is located in a rearward position with respect to a medium facing surface. The coil film extends around the back gap portion, and the insulating film encloses the coil film. Moreover, the second magnetic film entirely covers the insulating film.

11 Claims, 36 Drawing Sheets

MAGNETIC HEAD, HEAD ASSEMBLY AND MAGNETIC RECORDING/REPRODUCING APPARATUS AND METHOD FOR MANUFACTURING MAGNETIC HEAD

TECHNICAL FIELD

The present invention relates to a magnetic head, a head assembly, a magnetic recording/reproducing apparatus and a method for manufacturing a magnetic head.

BACKGROUND OF THE INVENTION

As a magnetic recording/reproducing apparatus, the best known is a hard disk drive (HDD). As to a magnetic head to be used for the HDD, perpendicular recording method has become a predominant recording method in order to improve recording density with respect to a hard disk. The perpendicular recording method provides not only a high linear recording density but also an advantage that the recording medium after recording is less influenced by thermal fluctuation. A magnetic head for perpendicular recording is disclosed, for example, in U.S. Pat. No. 6,954,340.

On the other hand, recently, the importance of data backup for data erasure problem has increased with increase in volume of data to be stored in an information processing device such as a server. As a device for backing up large-volume data, there has been widely used a magnetic tape device (magnetic recording/reproducing apparatus) typified by an LTO (Liner Tape-Open). In the case of the LTO, as much as 1.6 Tbytes data can be recorded on a half-inch width magnetic tape at a transmission rate of 120 Mbytes/sec or more.

The magnetic tape device is provided with a magnetic head for recording data on a magnetic tape or reading data recorded on the magnetic tape. The magnetic head is of the linear recording type, wherein since data is to be recorded and reproduced at every track defined along a longitudinal direction of the magnetic tape, a plurality of recording and reproducing elements for each track are arranged at intervals along a magnetic tape width direction. Typically, the magnetic head has recording and reproducing elements for 16 channels. Such a magnetic tape device is disclosed, for example, in Japanese Unexamined Utility-Model Application Publication No. 5-73728.

In both the magnetic head to be used for an HDD and the magnetic head to be used for an LTO, the recording element includes a first magnetic film, a second magnetic film, a coil film, and a coil insulating film. The first magnetic film has a first pole portion, and the second magnetic film has a second pole portion opposed to the first pole portion with a magnetic gap film therebetween and is joined to the first magnetic film at a back gap portion that is located in a rearward position with respect to a medium facing surface. The coil film extends around the back gap portion. The coil insulating film is typically made of an organic insulating resin and encloses the coil film. The second magnetic film is formed over the coil insulating film, covering an area extending from the medium facing surface to the back gap portion, i.e., a portion corresponding to the front half of the coil turn. The second magnetic film does not lie on the rear half of the coil turn.

As means for forming the second magnetic film, there are two methods. The first method is a frame plating method, while the second method is a sputter deposition method. In the case of the frame plating method, at first, after a plating undercoat film is formed on the surface of the coil insulating film and its surrounding area by sputtering or the like, a resist frame corresponding to a pattern of the second magnetic film is formed on the plating undercoat film, and a plated film is grown on the plating undercoat film within an area defined by the resist frame, thereby forming the second magnetic film of a given pattern.

Thereafter, the resist frame is removed, and then an unnecessary plating undercoat film is removed by dry etching. Since the unnecessary plating undercoat film is exposed at the rear half of the coil insulating film, on which the second magnetic film does not exist, dry etching is also performed on the rear half of the coil insulating film.

In the case of the sputter deposition method being the second method, after a magnetic film is formed by sputtering, the second magnetic film is obtained such that the magnetic film is etched into a given pattern by dry etching. The magnetic film formed by sputtering has excellent abrasion resistance as compared with the plated film. This advantage is particularly desirable for a magnetic recording/reproducing apparatus typified by an LTO (Liner Tape-Open). Since the sputtered film for the second magnetic film is formed on the surface of the coil insulating film, dry etching is also performed on the rear half of the coil insulating film.

Regardless of which one of the first and second methods is adopted, as described above, dry etching is performed on the rear half of the coil insulating film in the course of formation of the second magnetic film. Therefore, if the thickness of the coil insulating film is insufficient, the coil film lying inside the coil insulating film will be exposed to etching. Avoiding this problem requires an increase in thickness of the coil insulating film, which increases the distance between the second magnetic film to be formed on the surface of the coil insulating film and the coil film, deteriorating the electromagnetic characteristic.

SUMMARY OF THE INVENTION

It is an object of the present invention to provide a magnetic head whose electromagnetic characteristic can be improved by minimizing the distance between a magnetic film to be formed on the surface of a coil insulating film and a coil film.

It is another object of the present invention to provide a head assembly and a magnetic recording/reproducing apparatus incorporating the above magnetic head.

It is still another object of the present invention to provide a manufacturing method suitable for manufacturing the above magnetic head.

1. Magnetic Head

In order to solve at least one of the above problems, a recording element in a magnetic head according to the present invention includes a first magnetic film, a second magnetic film, a coil film, and a coil insulating film. The first magnetic film has a first pole portion, and the second magnetic film has a second pole portion opposed to the first pole portion with a magnetic gap film therebetween and is joined to the first magnetic film at a back gap portion that is located in a rearward position with respect to a medium facing surface. The coil film extends around the back gap portion, and the coil insulating film encloses the coil film.

The above configuration is common among magnetic heads of this type. The feature of the present invention resides in that the second magnetic film entirely covers the coil insulating film.

With this configuration, regardless of which one of a frame plating process and a sputter deposition process is adopted as a process of forming the second magnetic film, it becomes unnecessary to perform dry etching on the coil insulating film in the course of formation of the second magnetic film. In the dry etching process, accordingly, dry etching is prevented from advancing to the coil insulating film underlying the second magnetic film. Thus, the thickness of the coil insulating film can be reduced to bring the second magnetic film closer to the coil film, thereby improving the electromagnetic characteristic.

The second magnetic film may be either a plated film or a sputtered film. The magnetic film formed by sputtering has excellent abrasion resistance as compared with the plated film. This advantage is particularly desirable for a magnetic recording/reproducing apparatus typified by an LTO (Liner Tape-Open). The first magnetic film may also be formed as a plated film or a sputtered film.

The structure that the second magnetic film entirely covers the coil insulating film can be realized by making the track direction width of the second pole portion in the second magnetic film larger than the track direction width of the first pole portion. With this, the coil insulating film adjacent the second pole portion can also be covered with the second magnetic film.

In general, the magnetic head according to the present invention may include a reproducing element. In this case, preferably, the reproducing element is an element using giant magneto-resistive (GMR) effect, such as a spin-valve film, or a ferromagnetic tunnel junction element (TMR element).

The magnetic head according to the present invention may be a floating-type magnetic head to be used for an HDD or a contact-type magnetic head to be used for an LTO. The floating-type magnetic head to be used for an HDD includes a slider, wherein the recording and reproducing elements are supported by the slider. The contact-type magnetic head to be used for an LTO includes a plurality of units of the recording and reproducing elements, wherein individual units are arranged at intervals in one direction.

2. Head Assembly

The floating-type magnetic head to be used for an HDD is combined with a head support device such as a gimbal, constituting a head assembly. The head support device supports the magnetic head in such a manner as to permit rolling and pitching of the magnetic head.

3. Magnetic Recording/Reproducing Apparatus

The above head assembly is further combined with a hard disk (magnetic recording medium), constituting an HDD (magnetic recording/reproducing apparatus). In the HDD, data is written on the hard disk with the recording element of the magnetic head and read from the hard disk with the reproducing element of the magnetic head.

The contact-type magnetic head to be used for an LTO is combined with a magnetic tape driving means and a magnetic tape, constituting a magnetic tape device (magnetic recording/reproducing apparatus). In this case, the magnetic tape driving means is adapted to run the magnetic tape along a tape running direction. The magnetic head has a tape bearing surface in sliding contact with the magnetic tape for writing data on the magnetic tape with the recording element and reading data from the magnetic tape with the reproducing element.

4. Method for Manufacturing a Magnetic Head

The present invention further discloses a method for manufacturing the foregoing magnetic head. The manufacturing method includes two methods: a sputter deposition method and a frame plating method.

In the case of the sputter deposition method, when manufacturing the magnetic head, a magnetic film is formed by sputtering over an entire surface including a surface of the coil insulating film after formation of the first magnetic film, the coil film, and the coil insulating film. Then, the magnetic film is dry etched outside an area of the coil insulating film to form the second magnetic film, which entirely covers the coil insulating film.

In this process, since the dry etching for the magnetic film is performed outside an area of the coil insulating film, the coil insulating film is prevented from being damaged by the dry etching.

In the case of the frame plating method, when manufacturing the magnetic head, a plating undercoat film is formed over an entire surface including a surface of the coil insulating film after formation of the first magnetic film, the coil film, and the coil insulating film. Then, the second magnetic film is formed in a pattern which entirely covers the coil insulating film by using a frame plating process. Then, the plating undercoat film is dry etched outside the coil insulating film.

In this process, since the dry etching for the plating undercoat film is performed outside an area of the coil insulating film, the coil insulating film is prevented from being damaged by the dry etching.

The other objects, constructions and advantages of the present invention will be further detailed below with reference to the attached drawings. However, the attached drawings show only illustrative examples.

DESCRIPTION OF THE PREFERRED EMBODIMENTS

1. Magnetic Head

Figure 1:
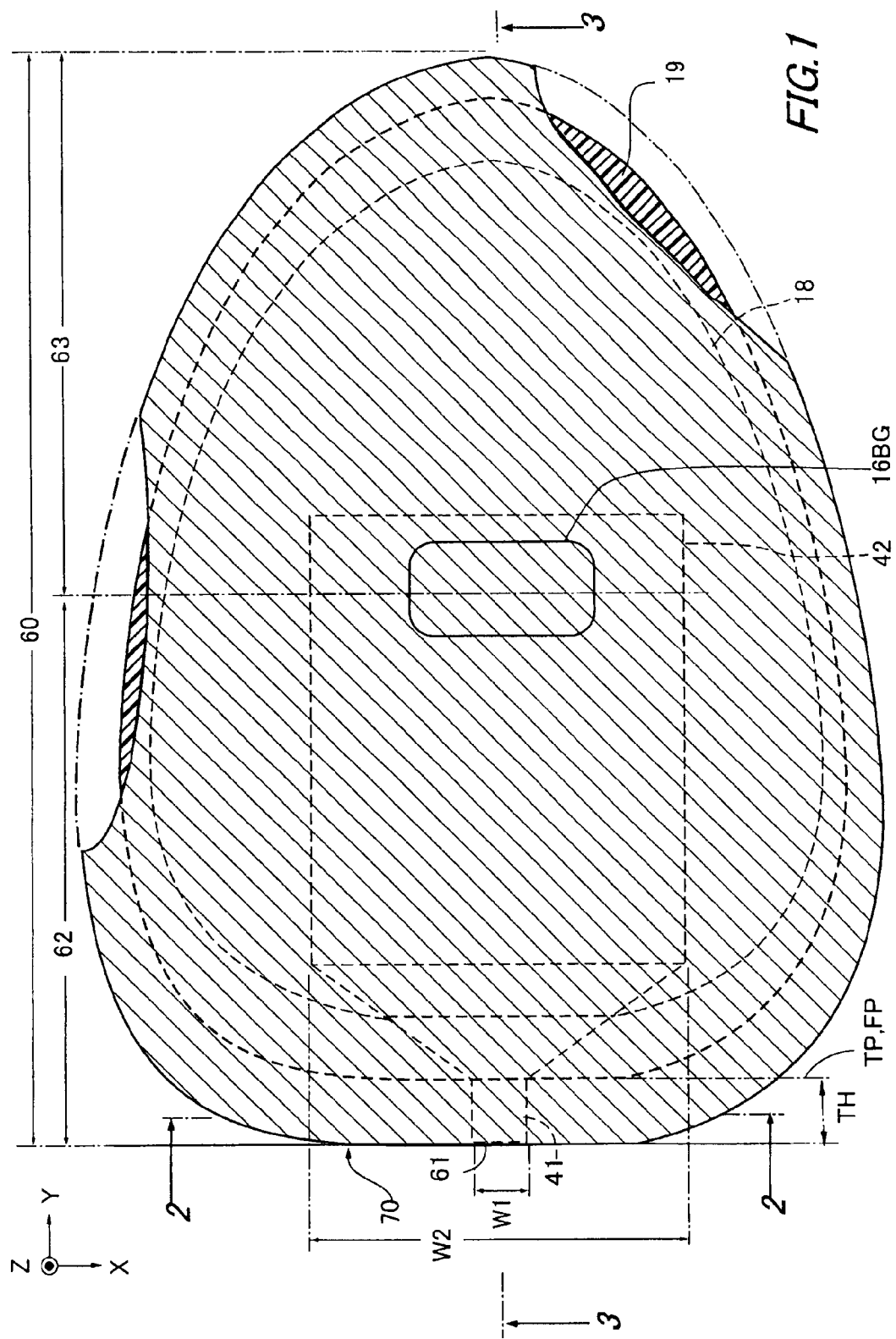
FIG. 1 is a partially broken away plan view showing a portion of recording and reproducing elements included in a magnetic head according to the present invention.
Figure 2:
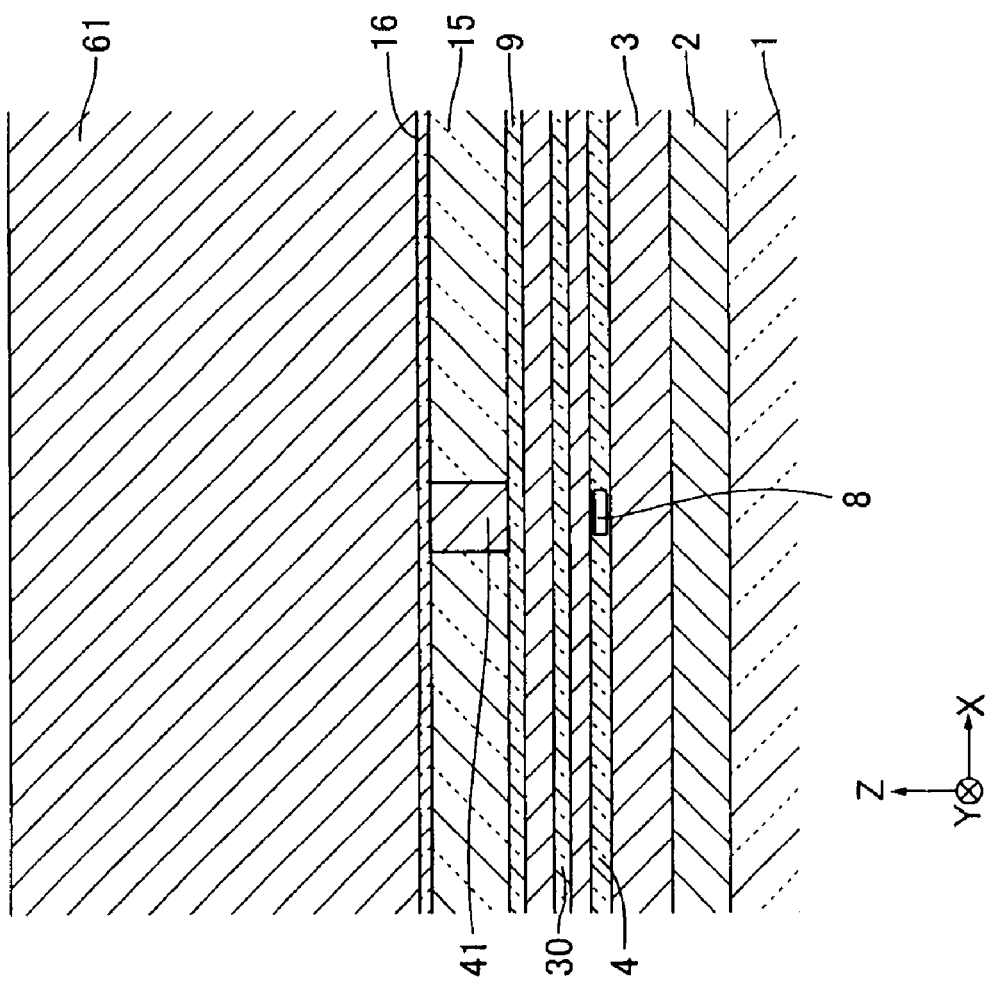
FIG. 2 is a cross-sectional view taken along line 2-2 in FIG. 1.
Figure 3:
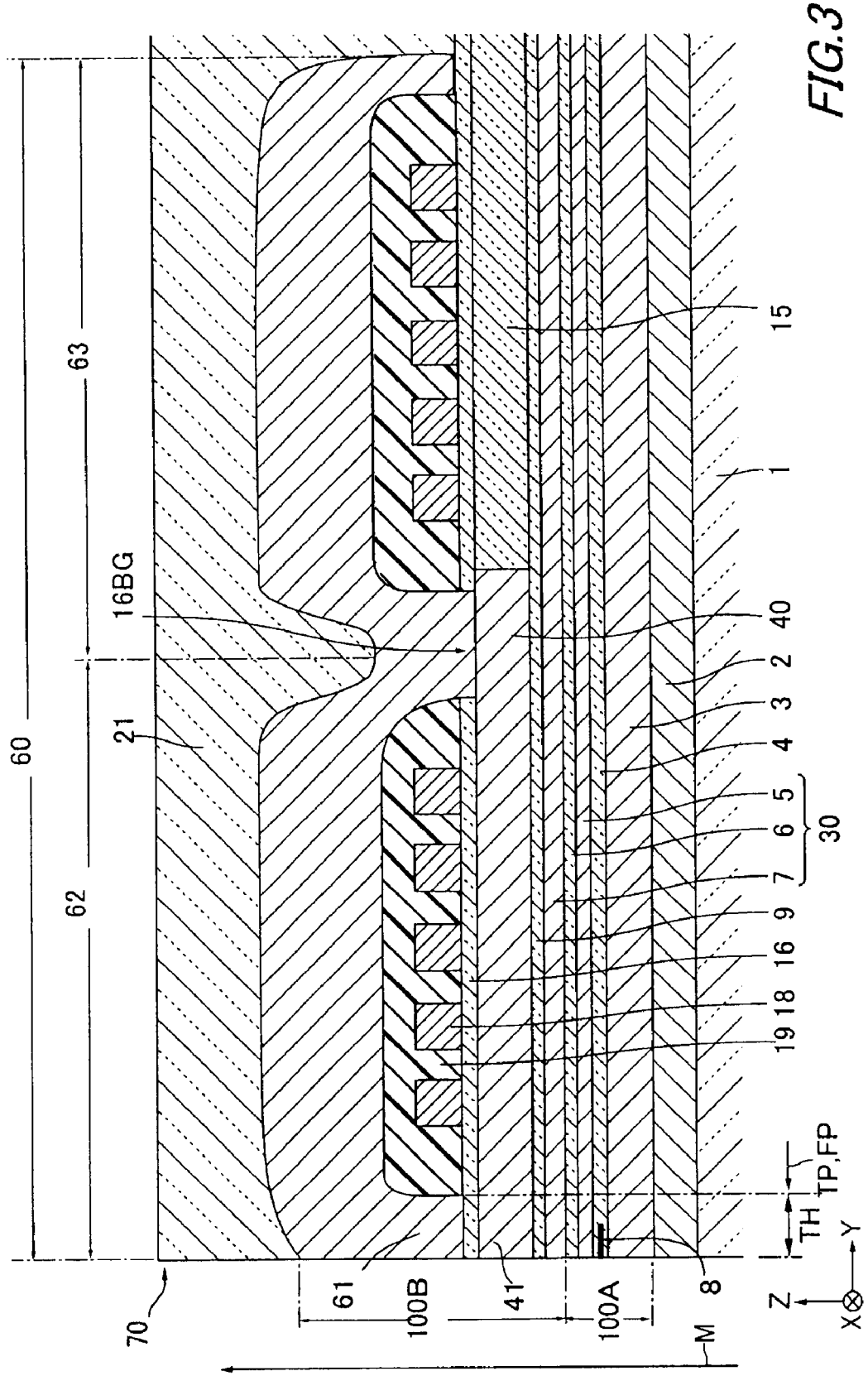
FIG. 3 is a cross-sectional view taken along line 3-3 in FIG. 1.

Referring first to FIGS. 1 to 3, one embodiment of a magnetic head according to the present invention will be described. In FIGS. 1 to 3, dimensions along X, Y and Z axes are called "width", "length" and "thickness/height", respectively. Along the Y axis, moreover, sides close to and remote from a medium facing surface 70 are designated by "front" and "rear", respectively, and being positioned forward and being positioned rearward are expressed by "project" and "recede", respectively.

The magnetic head shown in FIGS. 1 to 3 is a complex-type head which can perform both recording and reproducing. In the magnetic head, an insulating film 2, a reproducing element 100A using magneto-resistive effect (MR), a separating film 9, a recording element 100B for performing a recording process, for example, in a perpendicular recording method, and a non-magnetic film 21 for serving as an overcoat film are stacked on a substrate 1 in the mentioned order.

The reproducing element 100A is formed, for example, by stacking a lower read shield film 3, a shield gap film 4, and an upper read shield film 30 in the mentioned order. In the shield gap film 4, a reproducing element 8 (or MR element) is embedded in such a manner as to be exposed on the medium facing surface 70. The medium facing surface 70 is an air bearing surface in a floating-type magnetic head or a tape bearing surface in a contact-type magnetic head.

Both the lower read shield film 3 and the upper read shield film 30 function to magnetically separate the MR element 8 from the surroundings and extend rearward from the medium facing surface 70. The lower read shield film 3 is made of, for example, a magnetic material such as a nickel-iron alloy (NiFe). The upper read shield film 30 is formed, for example, by stacking two upper read shield film portions 5, 7 with a non-magnetic film 6 interposed therebetween. Both the upper read shield film portions 5, 7 are made of, for example, a magnetic material such as a nickel-iron alloy. The non-magnetic film 6 is made of, for example, a non-magnetic material such as ruthenium (Ru) or alumina.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording element 100B includes a first magnetic film 40, a magnetic gap film 16 with an opening (or back gap portion 16BG) for magnetic connection, a coil film 18 embedded in a coil insulating film 19, a second magnetic film 60, and an insulating film 15.

The first magnetic film 40 extends from the medium facing surface 70 to the back gap portion 16BG. The first magnetic film 40 includes, for example, a small-width first pole portion 41 extending rearward from the medium facing surface 70 and a large-width body portion 42 continuous with the rear of the first pole portion 41, as shown in FIG. 3.

The first pole portion 41 is a substantial magnetic flux emitting portion (so-called magnetic pole film) and has a constant width W1 which defines the recording track width. The body portion 42 is a portion intended to supply a magnetic flux to the first pole portion 41 and has a width W2 larger than the width W1. The width of the body portion 42 decreases in its front portion toward the first pole portion 41. The position where the width of the first magnetic film 40 starts to increase from the width W1 to the width W2 is a so-called flare point FP. The cross-section of the first magnetic film 40 may take an inverted trapezoidal shape, whose upper bottom and lower bottom are the longer side on the trailing side and the shorter side on the leading side, respectively.

The magnetic gap film 16 is made of, for example, a non-magnetic insulating material such as alumina or a non-magnetic conductive material such as ruthenium. The thickness of the magnetic gap film 16 is approximately 0.01 to 0.5 µm.

The coil film 18 functions to generate a magnetic flux and is made of, for example, a highly conductive material such as copper (Cu). The coil film 18 is wound around the back gap portion 16BG to have a winding structure (or spiral structure), as shown in FIG. 1.

The coil insulating film 19 for supporting the coil film 18 and electrically separating it from the surroundings is made of, for example, an organic non-magnetic insulating material such as a photoresist which becomes liquid when heated. Alternatively, the coil insulating film 19 may be made of an inorganic insulating material such as alumina. The forefront position of the coil insulating film 19 is a throat height zero position TP, and the distance between the throat height zero position TP and the medium facing surface 70 is a so-called throat height TH. FIG. 1 shows a case where the throat height zero position TP matches the flare point FP.

The second magnetic film 60 is formed on the surface of the coil insulating film 19 with a second pole portion 61 exposed on the medium facing surface 70. The second pole portion 61 is opposed to the first pole portion 41 with the magnetic gap film 16 therebetween. While the first pole portion 41 has a minute width W1, the second pole portion 61 widely extends in the width direction beyond the width W1 of the first pole portion 41 on both sides thereof. Moreover, the second magnetic film 60 extends rearward from the medium facing surface 70 on the trailing side of the first magnetic film 40 and is connected in a rearward position to the body portion 42 of the first magnetic film 40 through the back gap portion 16BG.

For the first pole portion 41 and the second pole portion 61, a variety of structures may be adopted depending on the difference in recording method and the purpose of characteristic improvement. The drawings show mere examples. In the case of a perpendicular recording magnetic head, for example, the second magnetic film 60 may have such a structure that a spreading component of a magnetic flux emitted from the first magnetic film 40 is absorbed to increase the gradient of the perpendicular magnetic field and a magnetic flux returning from a recording medium is also absorbed to circulate the magnetic flux between the recording element 100B and the recording medium. In the case of the perpendicular recording, the second magnetic film 60 may include, for example, a second write shield film and a return yoke film which are distinct from each other. The first and second write shield films function to mainly increase the gradient of the perpendicular magnetic field and are made of, for example, a high saturation magnetic flux density magnetic material such as a nickel-iron alloy or an iron-based alloy. Moreover, the first and second write shield films may constitute a so-called wrap-around structure.

The non-magnetic film 21 functions to protect the magnetic head and is made of, for example, a non-magnetic insulating material such as alumina.

The above configuration is common among magnetic heads of this type. The feature of the present invention resides in that the second magnetic film 60 entirely covers the coil insulating film 19 in the above structure. More specifically, the second magnetic film 60 covers the entire surface of the coil insulating film 19 and completely encircles the coil insulating film 19 with a given thickness at its peripheral area. The second magnetic film 60 has two regions: front and rear halves 62, 63 with reference to the back gap portion 16G. Although only the front half 62 has been provided theretofore, the rear half 63 continuous with the front half 62 is also provided in the present invention. The second magnetic film 60 may be either a plated film or a sputtered film.

With this configuration, regardless of which one of a frame plating method and a sputter deposition method is adopted as a process of forming the second magnetic film 60, it becomes unnecessary to perform dry etching on the coil insulating film 19 in the course of formation of the second magnetic film 60 for removing the unnecessary portion. In the dry etching process, accordingly, dry etching is prevented from advancing to the coil insulating film 19 underlying the second magnetic film 60. Thus, the thickness of the coil insulating film 19 can be reduced to bring the second magnetic film 60 closer to the coil film 18, thereby improving the electromagnetic characteristic.

The second magnetic film 60 formed by sputtering has excellent abrasion resistance as compared with the plated film. This advantage is particularly desirable for a magnetic recording/reproducing apparatus (magnetic tape device) typified by an LTO (Liner Tape-Open). The first magnetic film 40 may also be formed as a plated film or a sputtered film.

The structure that the second magnetic film 60 entirely covers the coil insulating film 19 can be realized by making the width of the second pole portion 61 in the second magnetic film 60 larger than the width W1 of the first pole portion 41. With this, the coil insulating film 19 adjacent the second pole portion 61 can also be covered with the second magnetic film 60.

Figure 4:
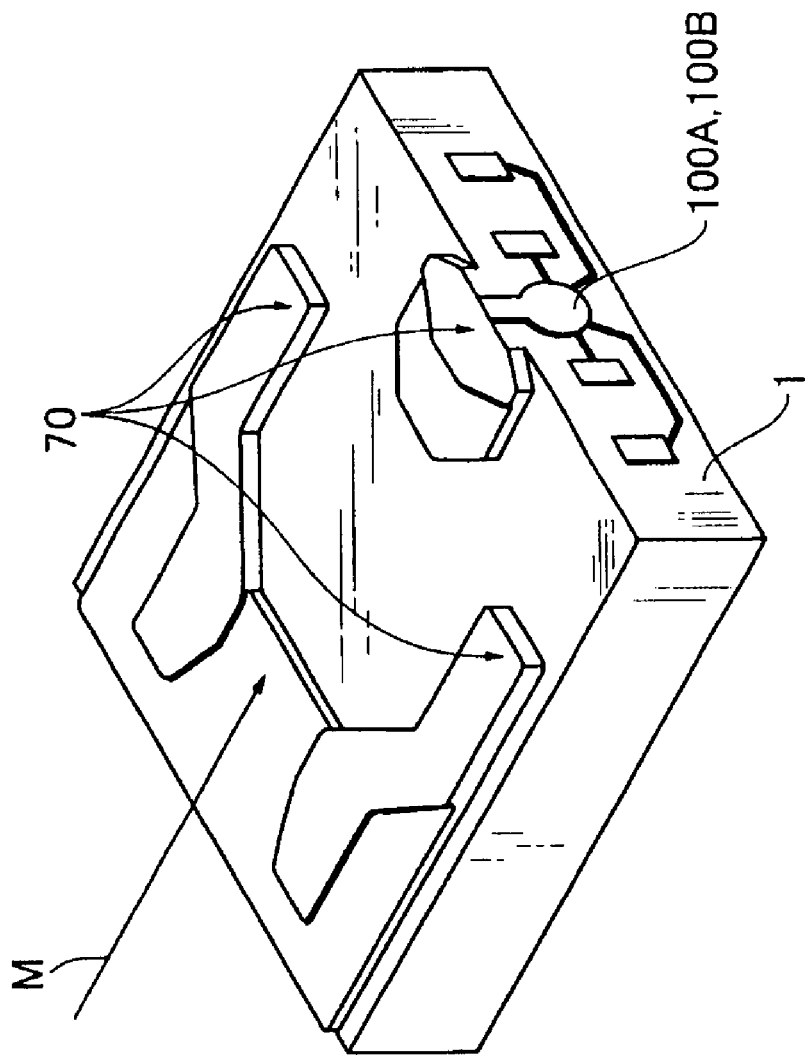
FIG. 4 is a perspective view of a magnetic head for use in an HDD.

The magnetic head according to the present invention may be a floating-type magnetic head to be used for an HDD or a contact-type magnetic head to be used for an LTO. FIG. 4 shows one example of a floating-type magnetic head to be used for an HDD in combination with a rapidly spinning magnetic recording medium, for example, a hard disk. Referring to the figure, the magnetic head has a slider substrate 1 with a generally rectangular prism structure. The slider substrate 1 has the medium facing surface 70, which directly relates to floating characteristics, with a recording/reproducing element (100A, 100B) disposed on a side end surface located at an air flow-out end (trailing edge) side with respect to an air flow direction M. The configuration of the recording/reproducing element (100A, 100B) is the same as shown in FIGS. 1 to 3.

Figure 5:
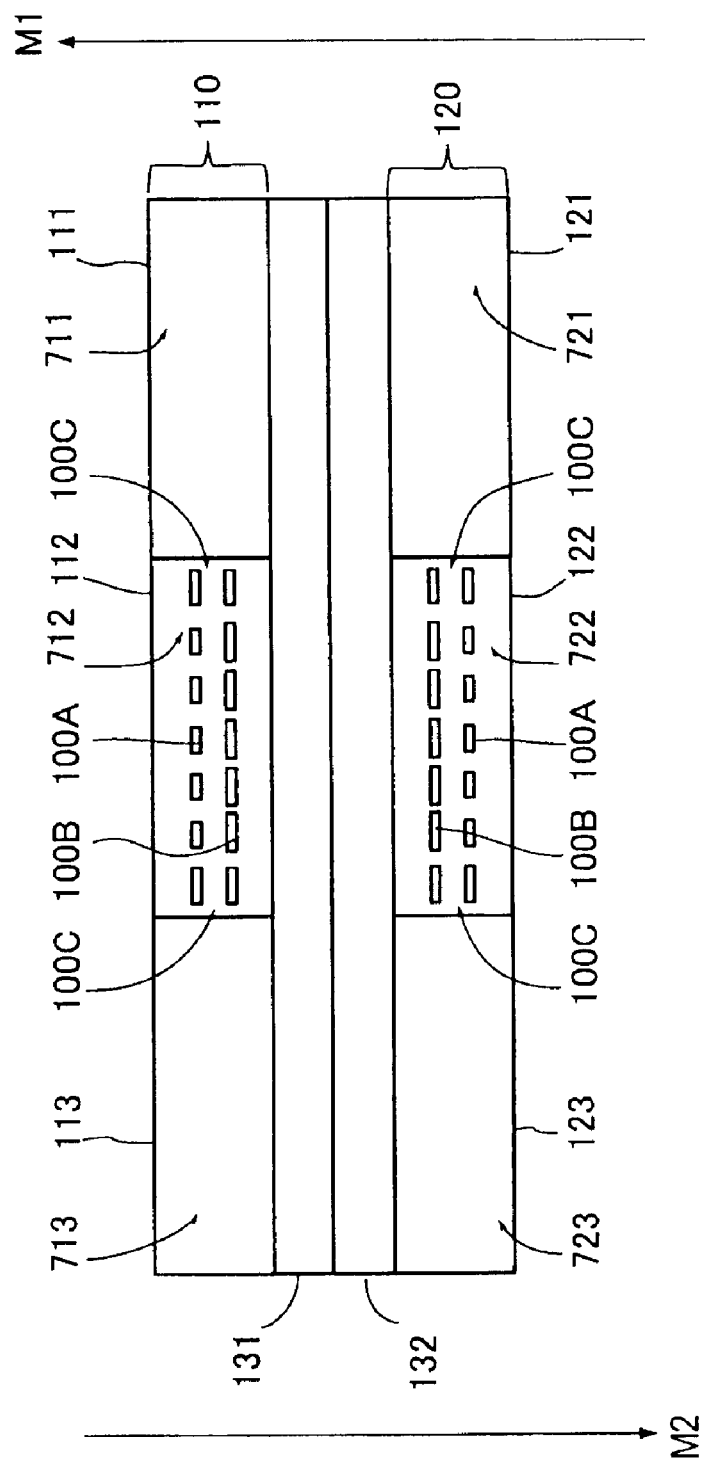
FIG. 5 is a front view of a magnetic head for use in an LTO.

Next, FIG. 5 shows an example of a contact-type magnetic head to be used for an LTO. The magnetic head includes first and second head portions 110, 120 having recording and reproducing elements 100B, 100A and first and second closures 131, 132 of a rectangular prism shape having the same width as the head portions 110, 120. It should be noted that the first and second head portions 110, 120 have the same structure and the first and second closures 131, 132 also have the same structure. The magnetic head is composed such that the first and second head portions 110, 120 are joined to the first and second closures 131, 132, respectively, and the first and second closures 131, 132 are further joined to each other in face-to-face relationship.

The head portion 110 has a substrate 112 and two auxiliary members 111, 113. The substrate 112 has a tape bearing surface 712 to be brought into sliding contact with a magnetic tape, while the auxiliary members 111, 113 also have tape bearing surfaces 711, 713, respectively. In the substrate 112, pairs of reproducing and recording elements 100A, 100B in alignment with each other along a tape running direction M1, M2 are arranged at intervals along a tape width direction. The reproducing and recording elements 100A, 100B are disposed in such a relationship that the reproducing element 100A is located on a tape entering side. At both ends of the array of the reproducing elements 100A and at both ends of the array of the recording elements 100B, moreover, there are arranged servo elements 100C for detecting the position with respect to the magnetic tape.

The head portion 120 has the same configuration as the head portion 110. That is, the head portion 120 has a substrate 122 and two auxiliary members 121, 123. The substrate 122 has a tape bearing surface 722 to be brought into sliding contact with the magnetic tape, while the auxiliary members 121, 123 also have tape bearing surfaces 721, 723, respectively. In the substrate 122, pairs of reproducing and recording elements 100A, 100B in alignment with each other along the tape running direction M1, M2 are arranged at intervals along the tape width direction. At both ends of the array of the reproducing elements 100A and at both ends of the array of the recording elements 100B, moreover, there are arranged servo elements 100C for detecting the position with respect to the magnetic tape. Of course, the recording element 100B has the same structure as shown in FIGS. 1 to 3.

2. Head Assembly

Next will be described a head assembly according to the present invention. The head assembly according to the present invention includes the magnetic head shown in FIG. 4 and a head support device. The head support device supports the magnetic head in such a manner as to permit rolling and pitching of the magnetic head. In the present invention, examples of the head assembly include an HGA (Head Gimbal Assembly) in which the magnetic head is mounted on a head support device (gimbal) and an HAA (Head Arm Assembly) in which the HGA is mounted on an arm.

Figure 6:
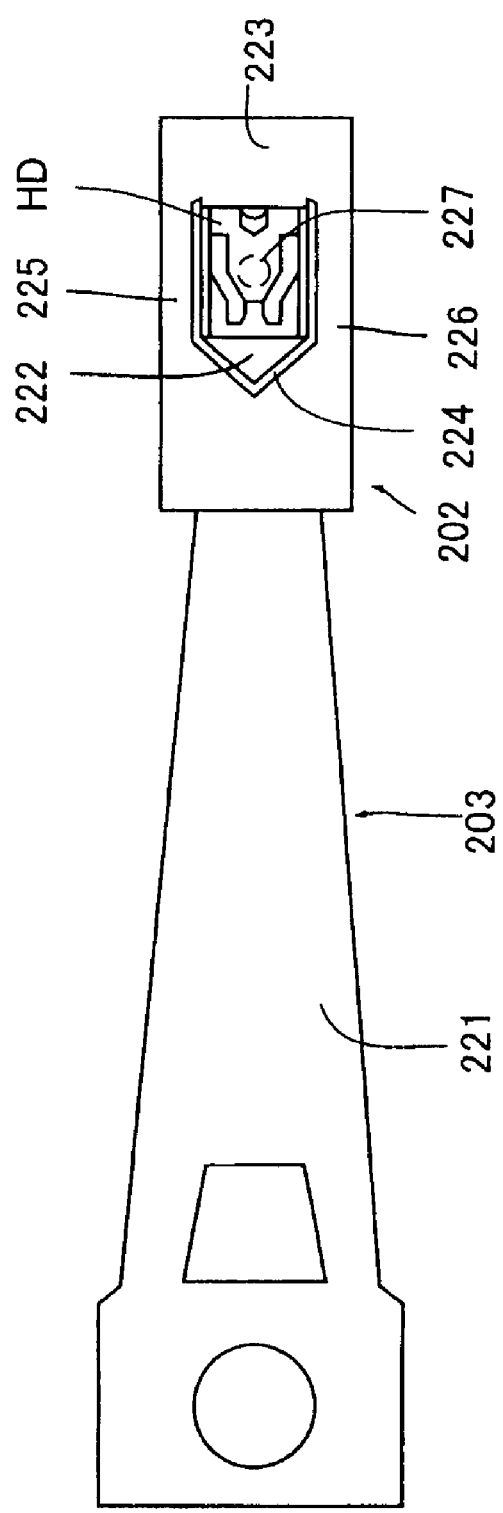
FIG. 6 is a plan view of a head assembly incorporating the magnetic head shown in FIG. 4.
Figure 7:
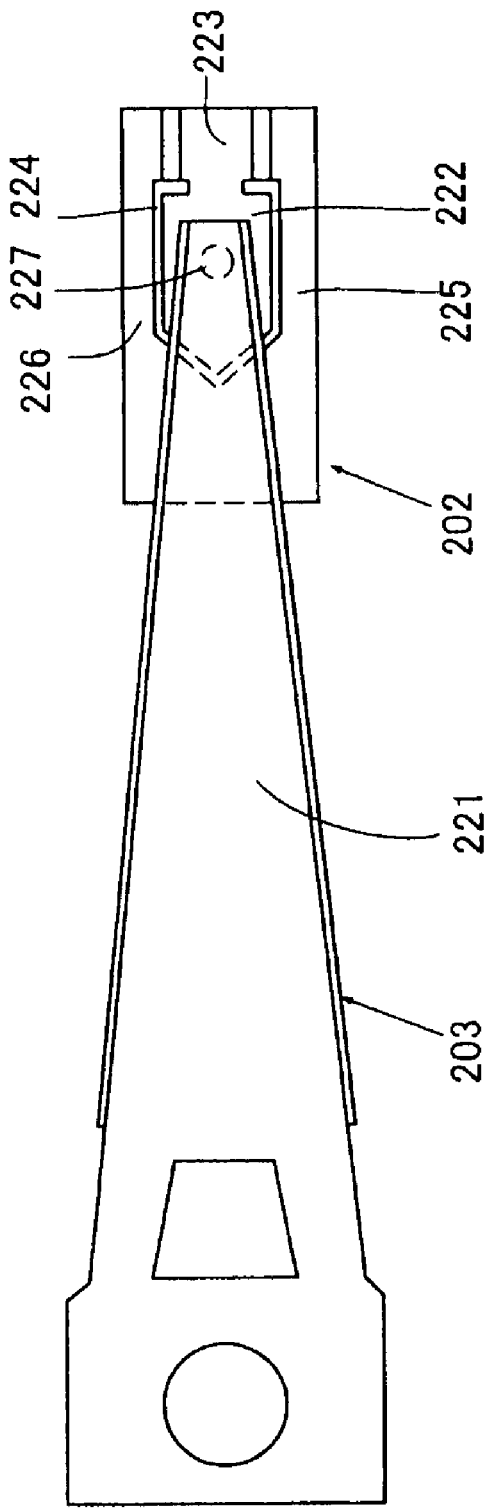
FIG. 7 is a bottom view of the head assembly shown in FIG. 6.

FIG. 6 is a front view of a head assembly according to the present invention, and FIG. 7 is a bottom view of the head assembly shown in FIG. 6. The illustrated head assembly is an HGA including a suspension 203 and a magnetic head HD. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head HD is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The magnetic head HD is attached to one side of the tongue portion 222 by means of an adhesive or the like to be in spring contact with the tip of the load dimple 227.

One surface of the magnetic head HD opposite to the air bearing surface of the slider is attached to the tongue portion 222 of the suspension 203. Flexible leads and the like not shown in the drawings are connected to the magnetic head HD.

Figure 8:
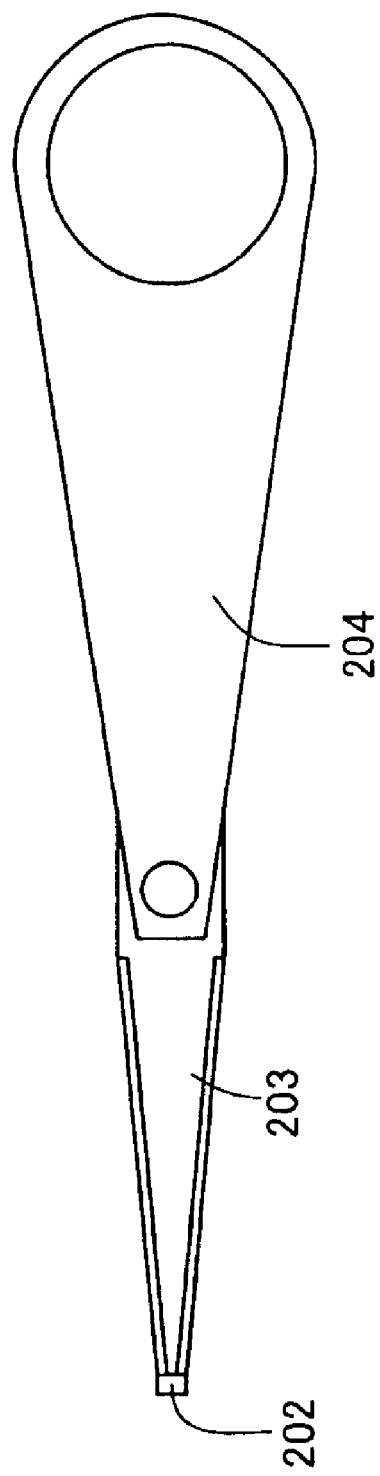
FIG. 8 is a plan view of another head assembly incorporating the head assembly shown in FIGS. 6 and 7.

FIG. 8 is a front view of an HAA. The illustrated HAA includes the suspension 203, the magnetic head HD and an arm 204. The arm 204 is integrally formed of a suitable non-magnetic metallic material such as an aluminum alloy. The arm 204 is provided with a mounting hole. The mounting hole is used for mounting on a positioning device provided in a magnetic disk apparatus. One end of the suspension 203 is secured to the arm 204, for example, with a ball connecting structure.

Since the head assembly includes the magnetic head according to the present invention, it can enjoy the effects.

3. Magnetic Recording/Reproducing Apparatus

Figure 9:
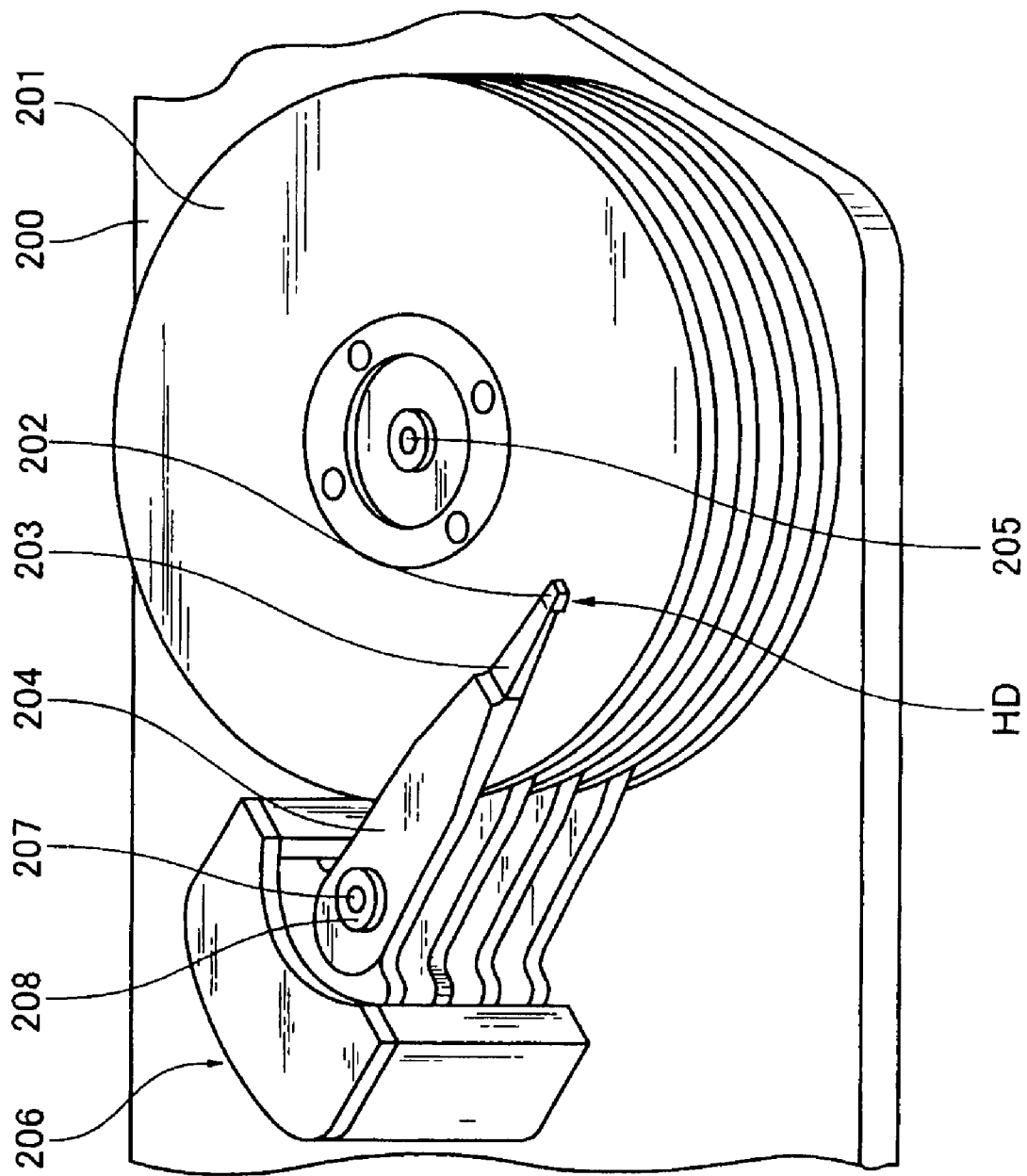
FIG. 9 is a perspective view of a magnetic recording/reproducing apparatus (HDD) incorporating the head assembly shown in FIG. 7.

FIG. 9 is a perspective view of a magnetic recording/reproducing apparatus typified by an HDD. In FIG. 9, a case 200 is shown partially cut-out for better viewability of the internal structure of the apparatus.

The magnetic recording/reproducing apparatus is mounted with the foregoing head assembly, and in the present embodiment, a hard disk drive is taken as an example for explanation. Within the case 200, the magnetic recording/reproducing apparatus includes a plurality of magnetic disks (i.e., hard disks) 201 corresponding to a magnetic recording medium M for magnetically recording information, a plurality of suspensions 203 disposed corresponding to the respective magnetic disks 201 and supporting the magnetic head HD at one end thereof, and a plurality of arms 204 supporting the other end of the suspension 203.

When the magnetic disk 201 rotates at the time of recording or reproducing operation of information, an air flow generated between the recording surface (magnetic head facing surface) of the magnetic disk 201 and the air bearing surface (medium facing surface) 70 is utilized to let the magnetic head HD take off from the recording surface of the magnetic disk 201.

The magnetic disks 201 are rotatable about a spindle motor 205 which is fixed to the case 200. The arms 204 are connected to an actuator 206 which functions as a power source and are pivotable through a bearing 208 about a fixed shaft 207 which is fixed to the case 200. The actuator 206 is constructed to include, for example, a driving source such as a voice coil motor.

With the head assembly that is provided with the magnetic head HD according to the present invention, as has been described above, the magnetic recording/reproducing apparatus records information on the magnetic disk 201 by applying a recording magnetic field and also reproduces information from the magnetic disk 201.

Figure 10:
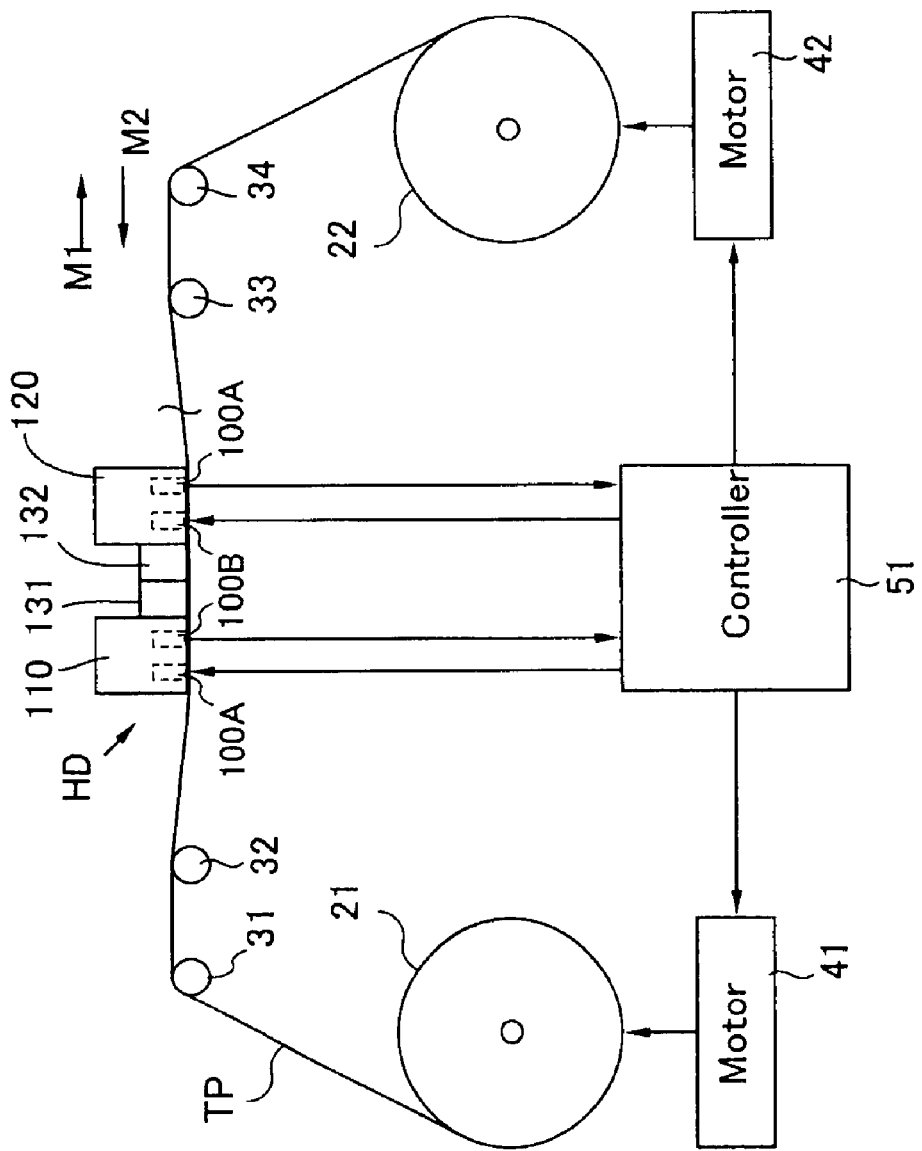
FIG. 10 is a diagram showing a configuration of the magnetic recording/reproducing apparatus (magnetic tape device) using the magnetic head shown in FIG. 5.
Figure 11:
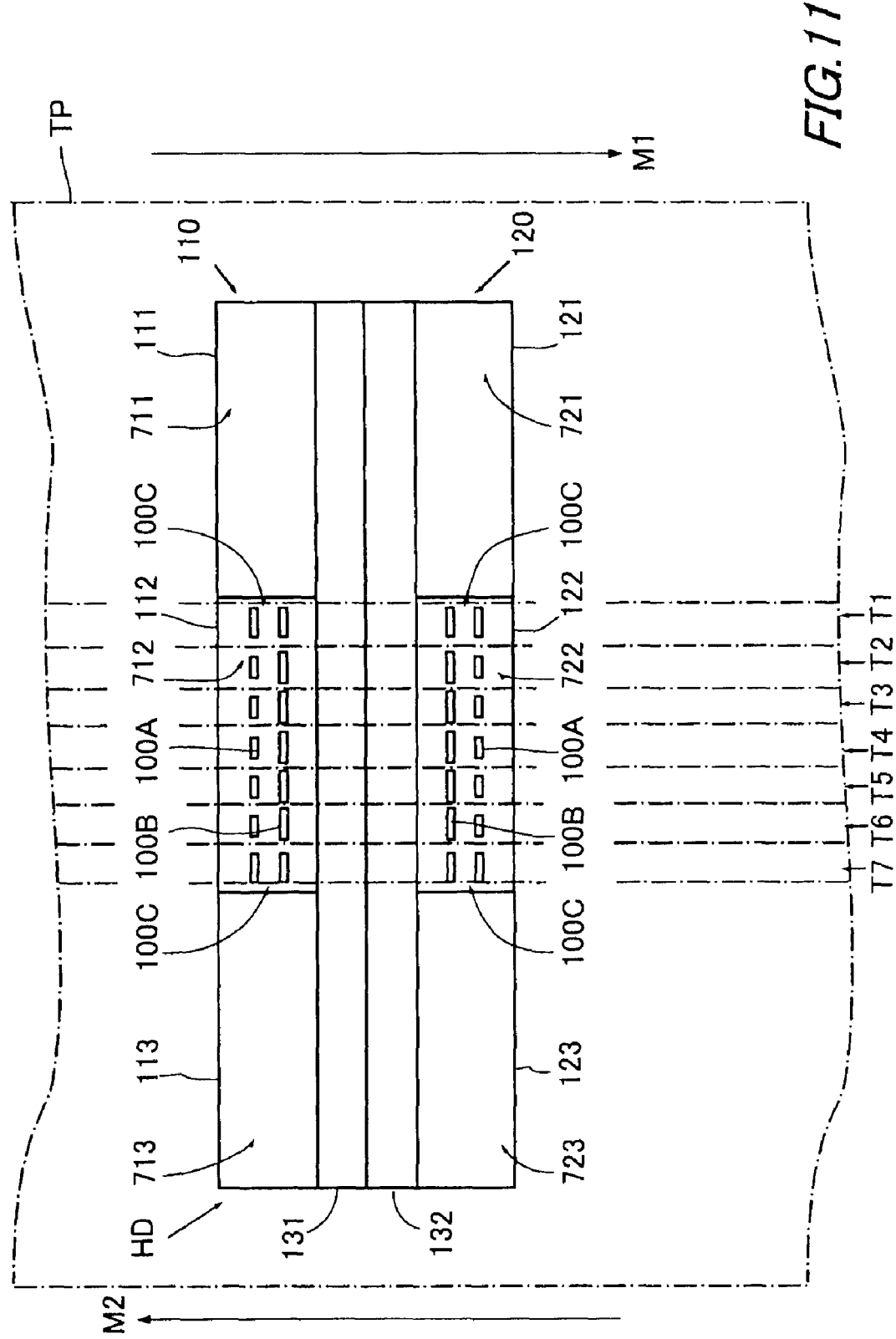
FIG. 11 is a diagram showing a relationship between the magnetic head and the magnetic tape in the magnetic tape device shown in FIG. 10.

Referring to FIGS. 10 and 11, next will be described an example of a magnetic tape device typified by an LTO. The illustrated magnetic tape device includes motors 41, 42, a plurality of guide pins 31 to 34, the magnetic head HD, and a controller 51. A magnetic tape TP being a recording medium is housed in a cassette case or the like while being wound about a pair of reels 21, 22.

When the cassette case housing the magnetic tape TP is set to the magnetic tape device, the portion extending between the pair of reels 21, 22 is guided by the plurality of guide pins 31 to 34.

The motors 41, 42 being a magnetic tape driving means make the pair of reels 21, 22 rotate through a power transmission system such as gears, whereby the magnetic tape TP runs along the tape running direction M1, M2. The motors 41, 42 can be driven in either rotation direction, and when the magnetic tape TP runs in the tape running direction M1, the pair of reels 21, 22 are rotated such that the magnetic tape TP is unwound from the reel 21 and taken up by the reel 22.

When the magnetic tape TP runs in the tape running direction M2, on the other hand, the pair of reels 21, 22 are rotated by the motors 41, 42 such that the magnetic tape TP is unwound from the reel 22 and taken up by the reel 21. The running magnetic tape TP is guided by the plurality of guide pins 31 to 34.

The magnetic head HD is positioned such that it can be pressed against the magnetic tape TP between the pair of reels 21, 22. The magnetic head HD has the tape bearing surface in sliding contact with the magnetic tape TP, writing data on the magnetic tape TP with the recording element 100B and reading data from the magnetic tape TP with the reproducing element 10A.

The magnetic head HD is the one illustrated in FIG. 11, and the reproducing, recording and servo elements 100A, 100B, 100C are disposed corresponding to tracks T1 to T7 defined along the tape width direction D31 of the magnetic tape for performing reading from and writing on corresponding tracks T1 to T7. It should be noted that the configuration of the tracks T1 to T7 is not limited to the illustrated one.

According to an operation from the outside, the controller 51 controls not only the rotation of the motors 41, 42 but also writing operation on the magnetic tape TP with data output to the recording element 100B of the magnetic head HD and reading operation from the magnetic tape TP with data input from the reproducing element 100A of the magnetic head HD.

4. Method for Manufacturing a Magnetic Head

The method for manufacturing a magnetic head according to the present invention is applicable to production of the second magnetic film 60 being a main component of the recording element 100B in the magnetic head exemplified in FIGS. 1 to 5. The processes before the production process of the recording element 100B have been known heretofore and do not require specific description. Roughly speaking, it can be manufactured by stacking a series of components in order by using a conventional thin-film process including a film formation technique such as plating or sputtering, a patterning technique such as photolithography, an etching technique such as dry etching or wet etching, and a polishing technique such as CMP (chemical mechanical polishing).

When manufacturing the magnetic head, at first, the insulating film 2 is formed on the slider substrate 1, and then the lower read shield film 3, the shield gap film 4 embedded with the MR element 8, and the upper read shield film 30 (the upper read shield film portions 5, 7 and the non-magnetic film 6) are stacked on the insulating film 2 in a predetermined order, thereby forming the reproducing element 100A.

Then, after the separating film 9 is formed on the reproducing element 100A, the insulating film 15, the first magnetic film 40, the magnetic gap film 16, the coil insulating film 19, the coil film 18 insulated by the insulating film, and the second magnetic film 60 are stacked in a predetermined processing order, thereby forming the recording element 100B. Finally, after the non-magnetic film 21 for functioning as an overcoat film is formed on the recording element 100B, the medium facing surface 70 is formed by using a machining process or a polishing process, thereby completing the magnetic head.

In the whole production process described above, the manufacturing method according to the present invention is mainly applicable to the process of forming the second magnetic film 60. The second magnetic film 60 may be formed by either a sputter deposition method or a plating deposition method. At first, description will be made about the sputter deposition process. It should be noted that the following production steps are all carried out on a wafer.

Figure 12:
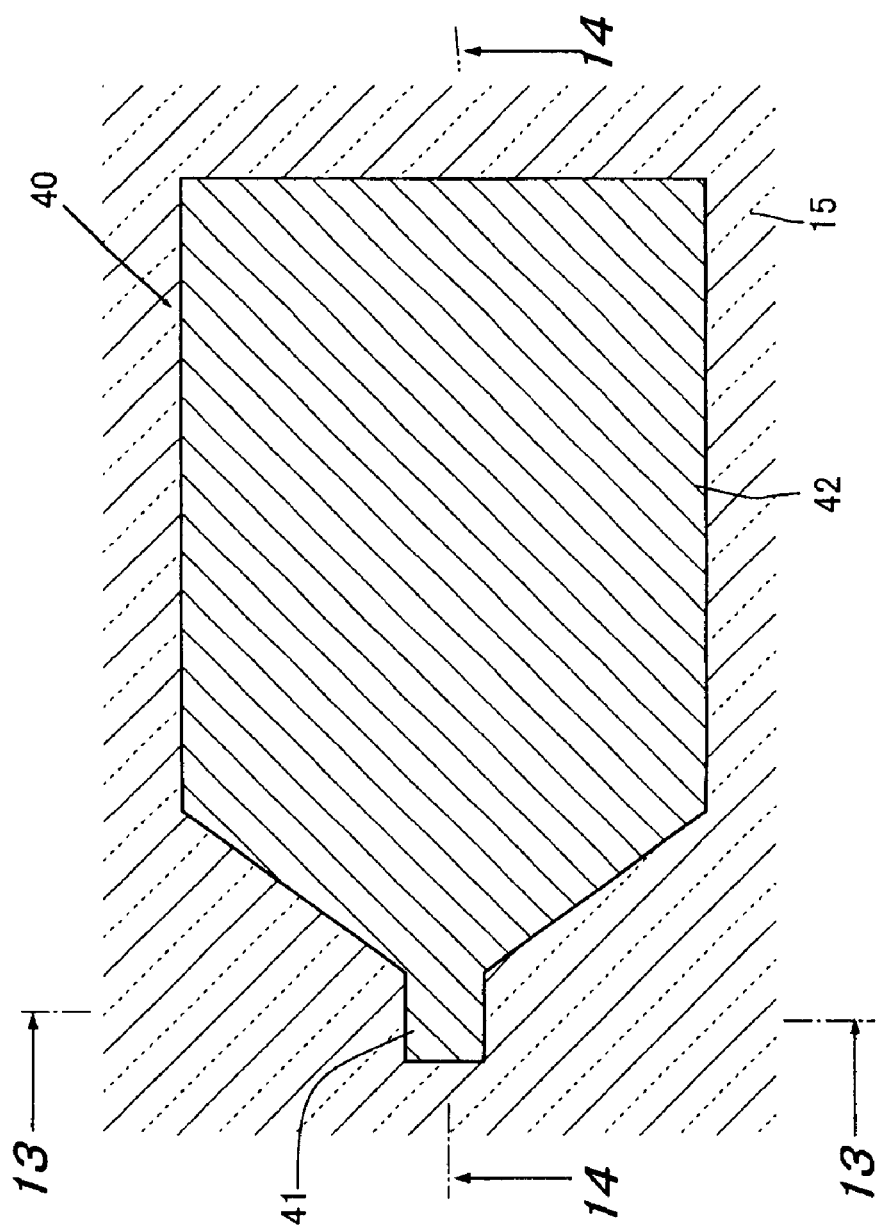
FIG. 12 is a plan view of a portion of the recording element, showing a step of manufacturing a magnetic head according to the present invention.
Figure 13:
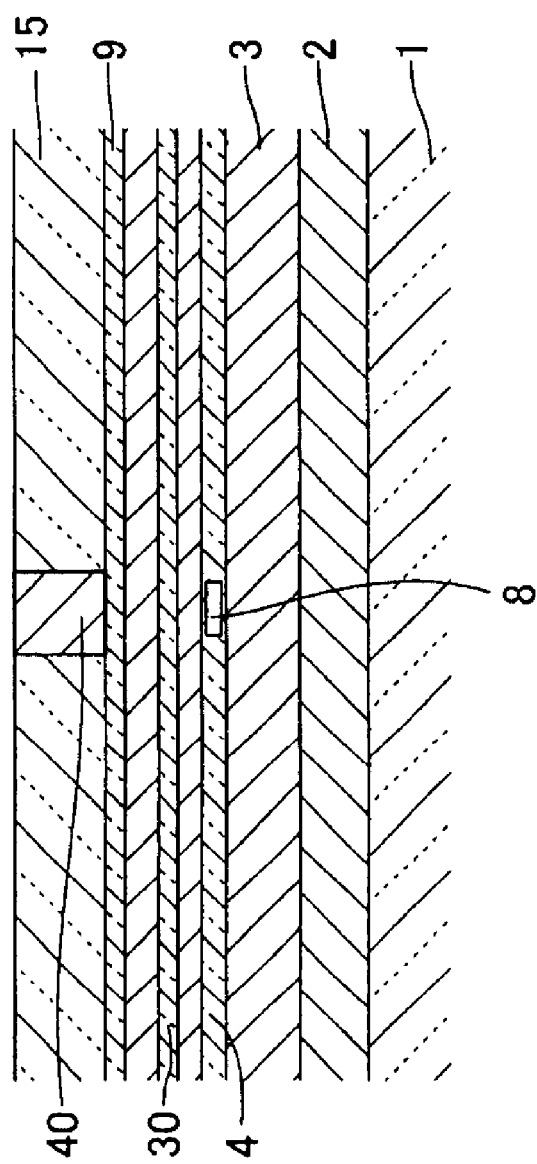
FIG. 13 is a cross-sectional view taken along line 13-13 in FIG. 12.
Figure 14:
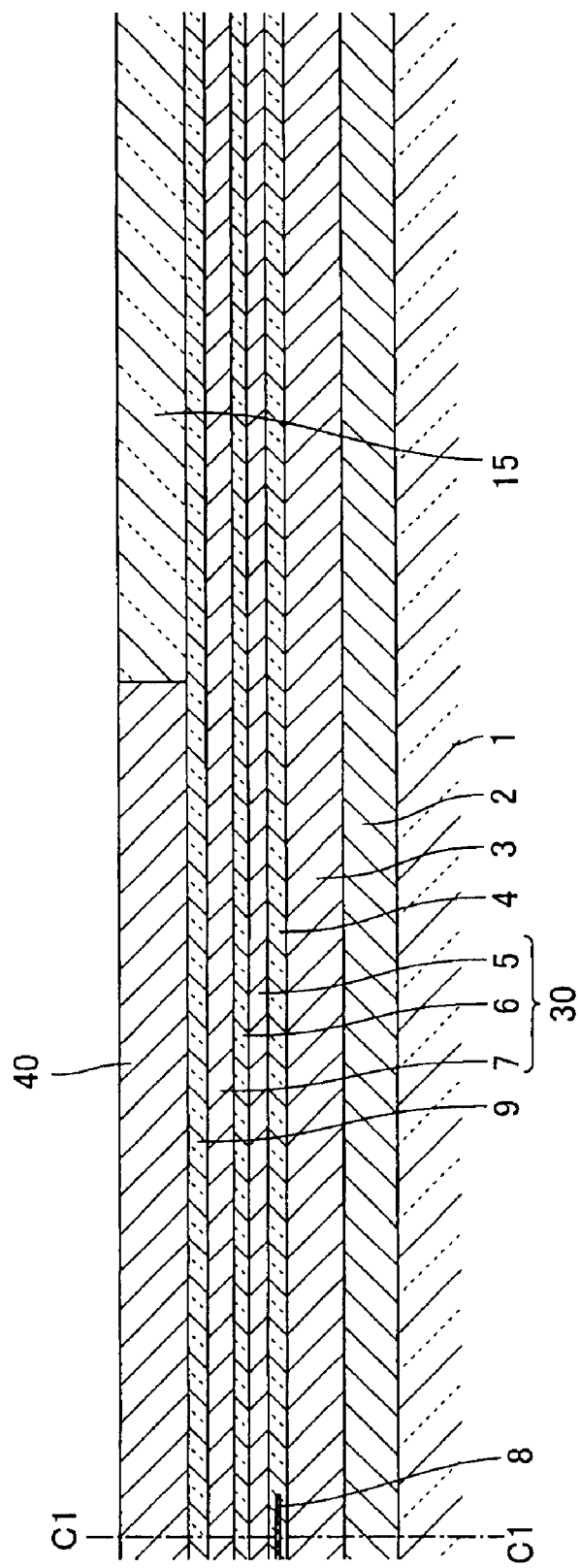
FIG. 14 is a cross-sectional view taken along line 14-14 in FIG. 12.

At first, the surface of the first magnetic film 40 formed on one surface of the separating film 9, which is made of $Al_2O_3$ or the like, and the surface of the insulating film 15 filling its surrounding area are planarized as shown in FIGS. 12 to 14. The first magnetic film 40, whose basic pattern and material have been already described, has the first pole portion 41 and the body portion 42.

Figure 15:
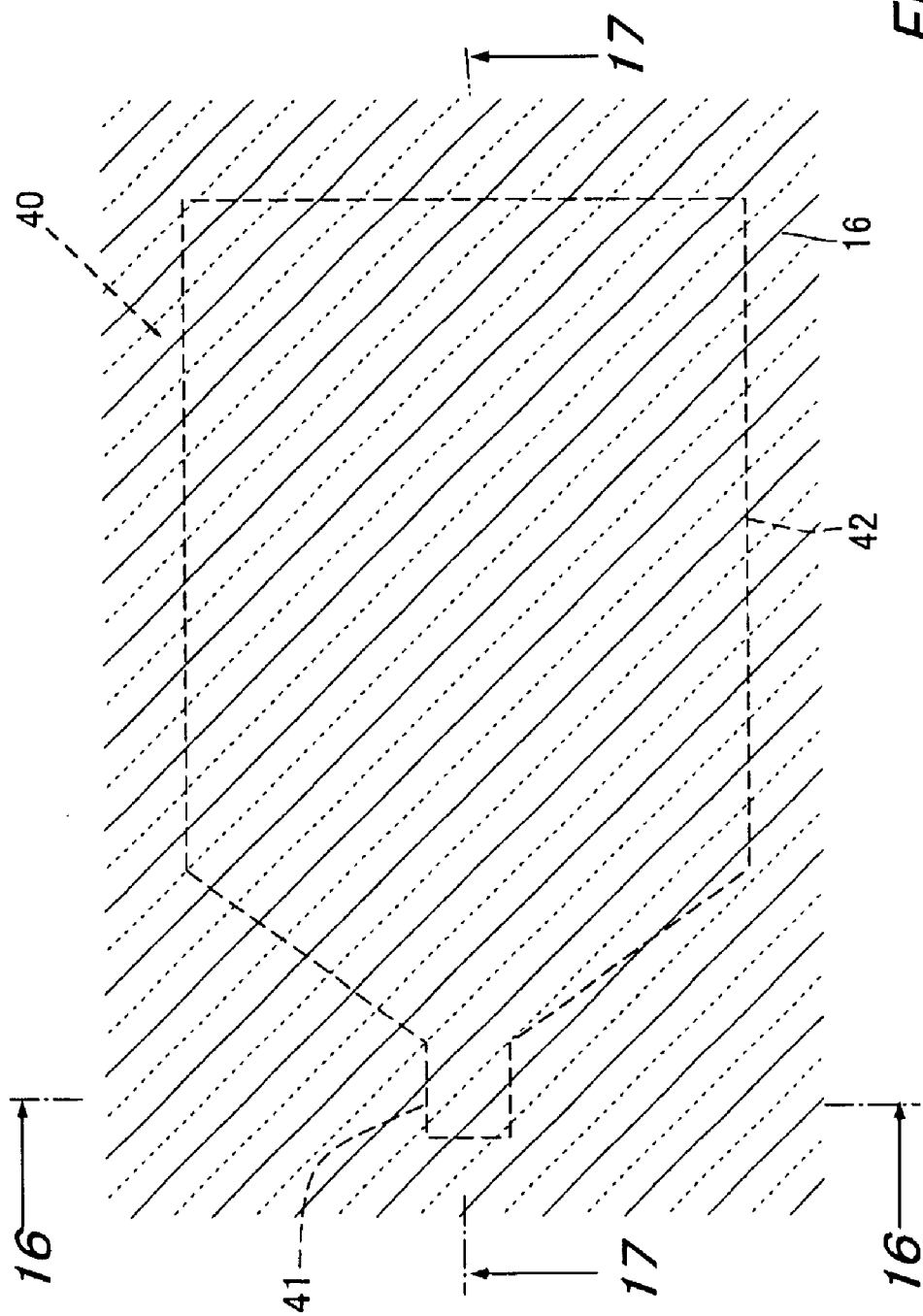
FIG. 15 is a plan view of a portion of the recording element, showing a step after the step shown in FIGS. 12 to 14.
Figure 16:
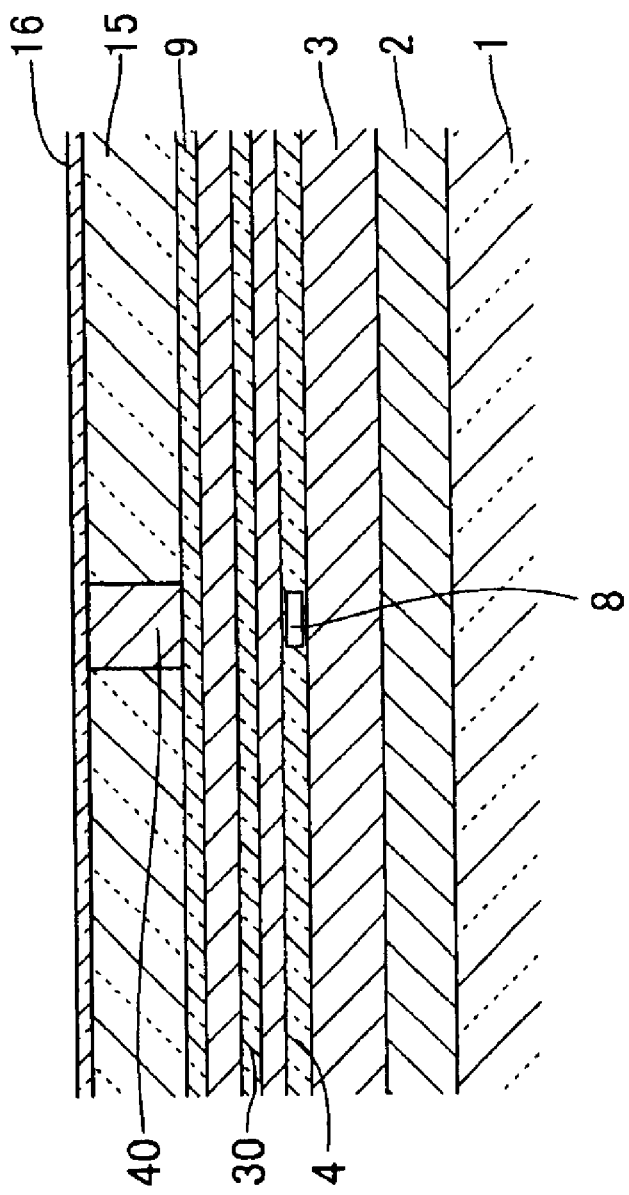
FIG. 16 is a cross-sectional view taken along line 16-16 in FIG. 15.
Figure 17:
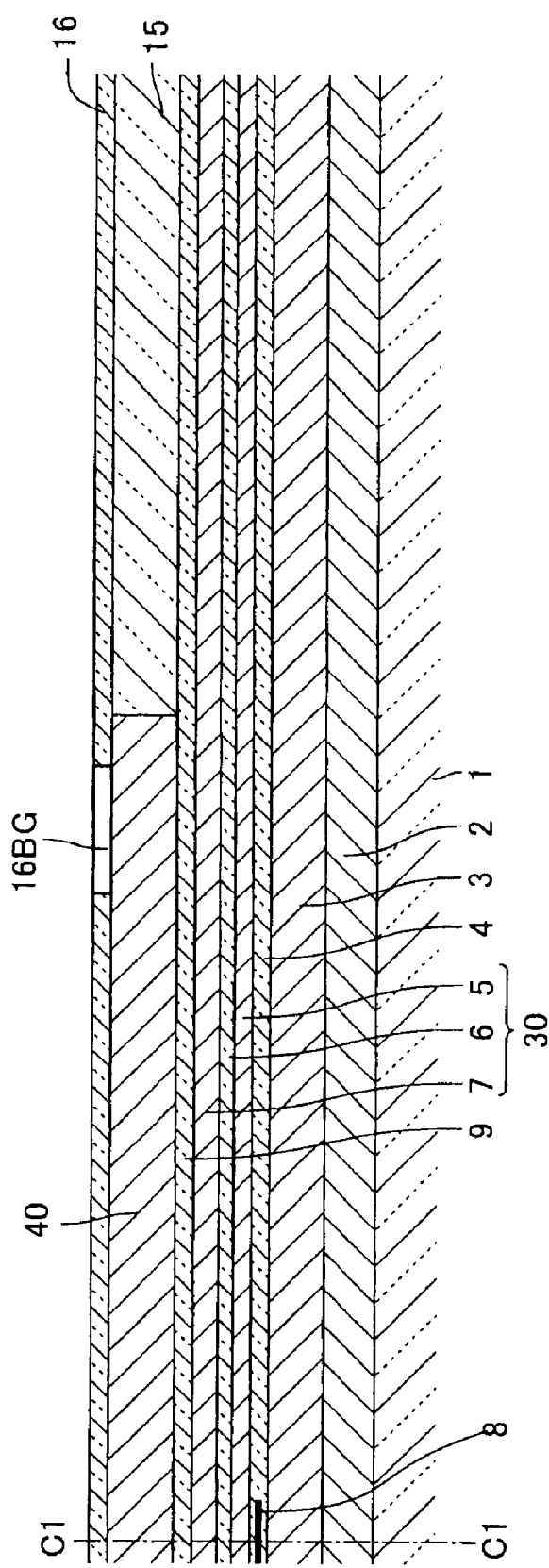
FIG. 17 is a cross-sectional view taken along line 17-17 in FIG. 15.

Then, the magnetic gap film 16 is formed on the planarized surface of the first magnetic film 40 and insulating film 15 by means of, for example, sputtering, as shown in FIGS. 15 to 17. The magnetic gap film 16 is formed with an opening for the back gap portion 16BG.

Figure 18:
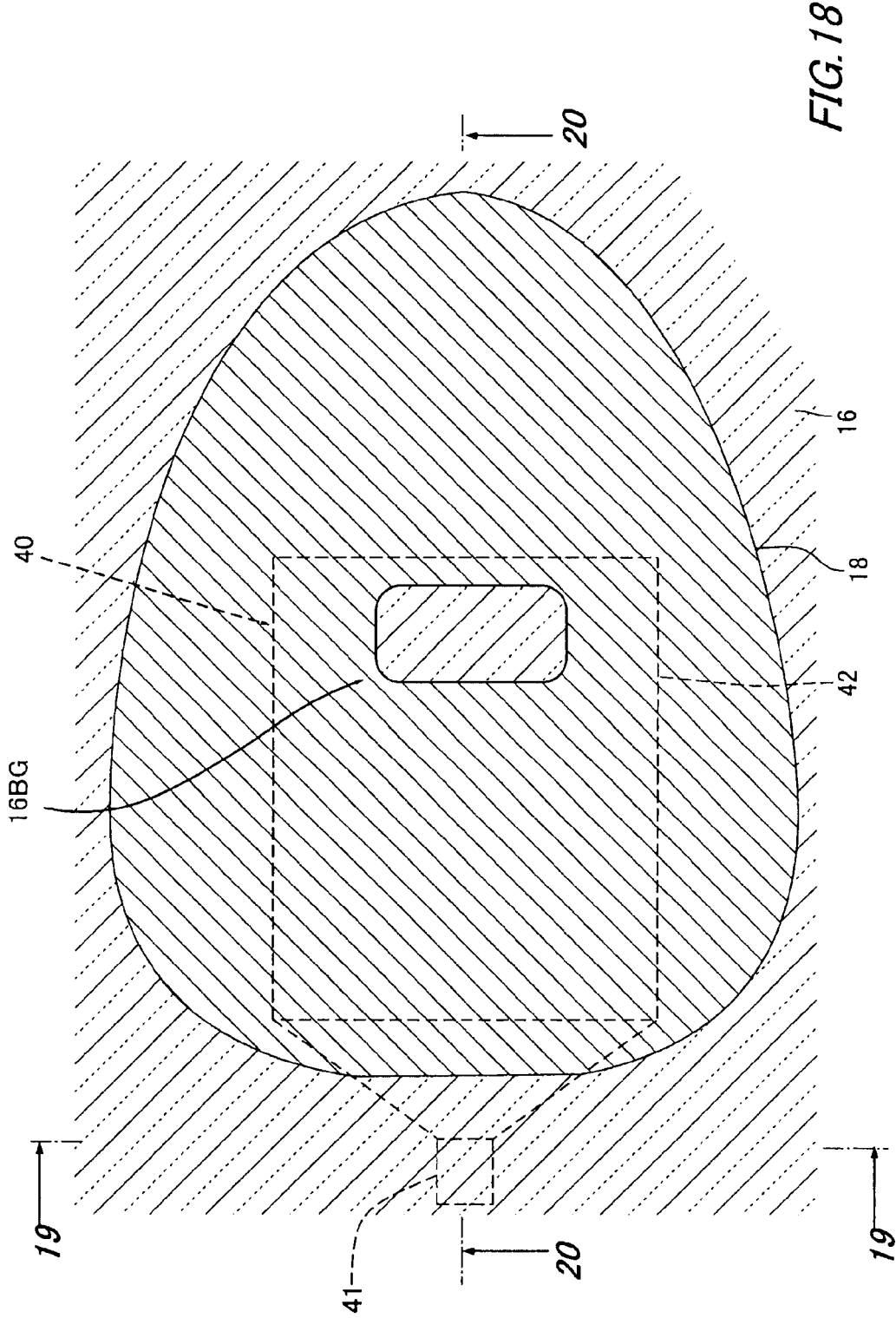
FIG. 18 is a plan view of a portion of the recording element, showing a step after the step shown in FIGS. 15 to 17.
Figure 19:
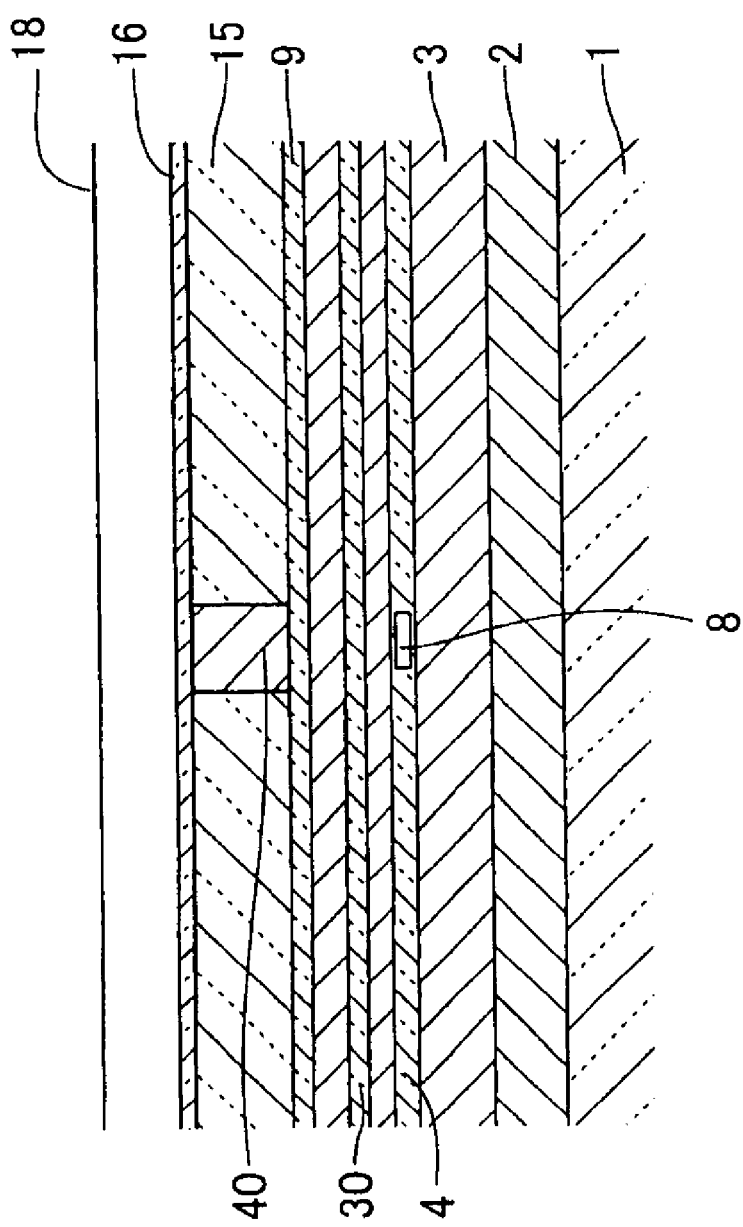
FIG. 19 is a cross-sectional view taken along line 19-19 in FIG. 18.
Figure 20:
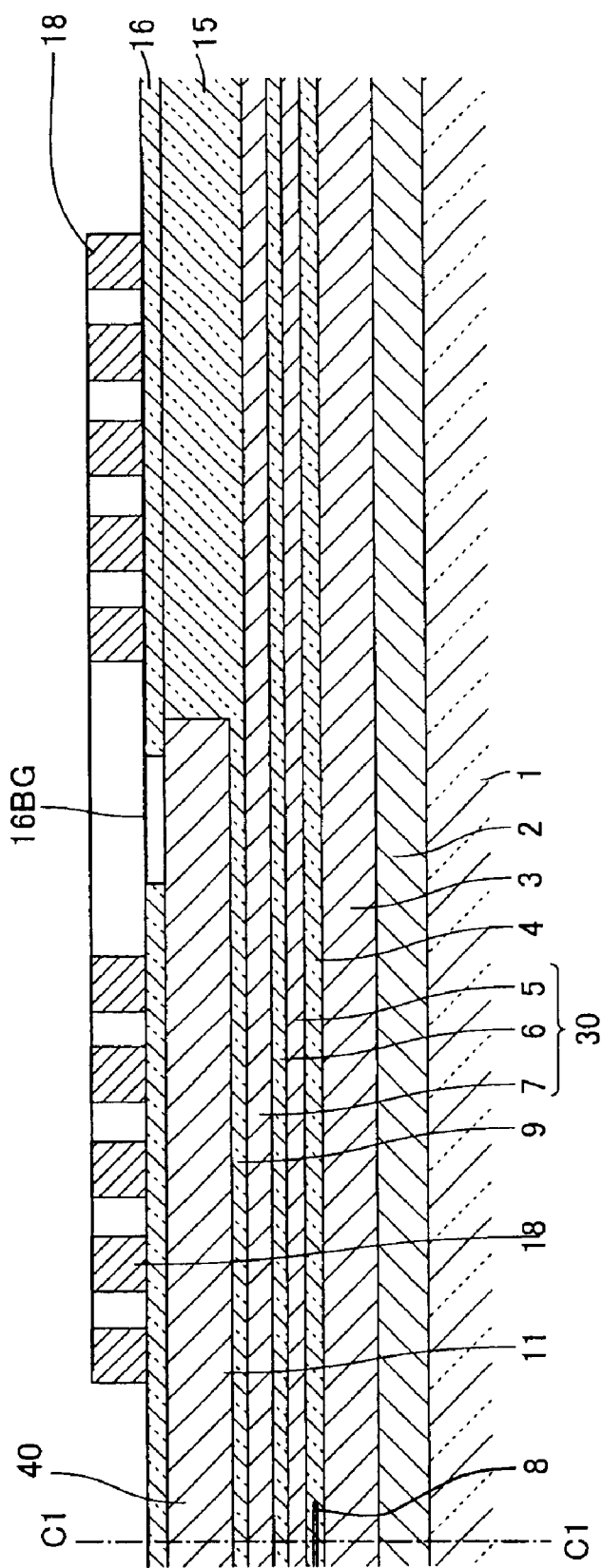
FIG. 20 is a cross-sectional view taken along line 20-20 in FIG. 18.

Then, by using a photolithography process or a plating process, the coil film 18 extending around the back gap portion 16BG is formed on the surface of the magnetic gap film 16 or an insulating film optionally formed thereon, as shown in FIGS. 18 to 20. The border line in FIG. 18 represents the outermost periphery of the formed coil film 18.

Figure 21:
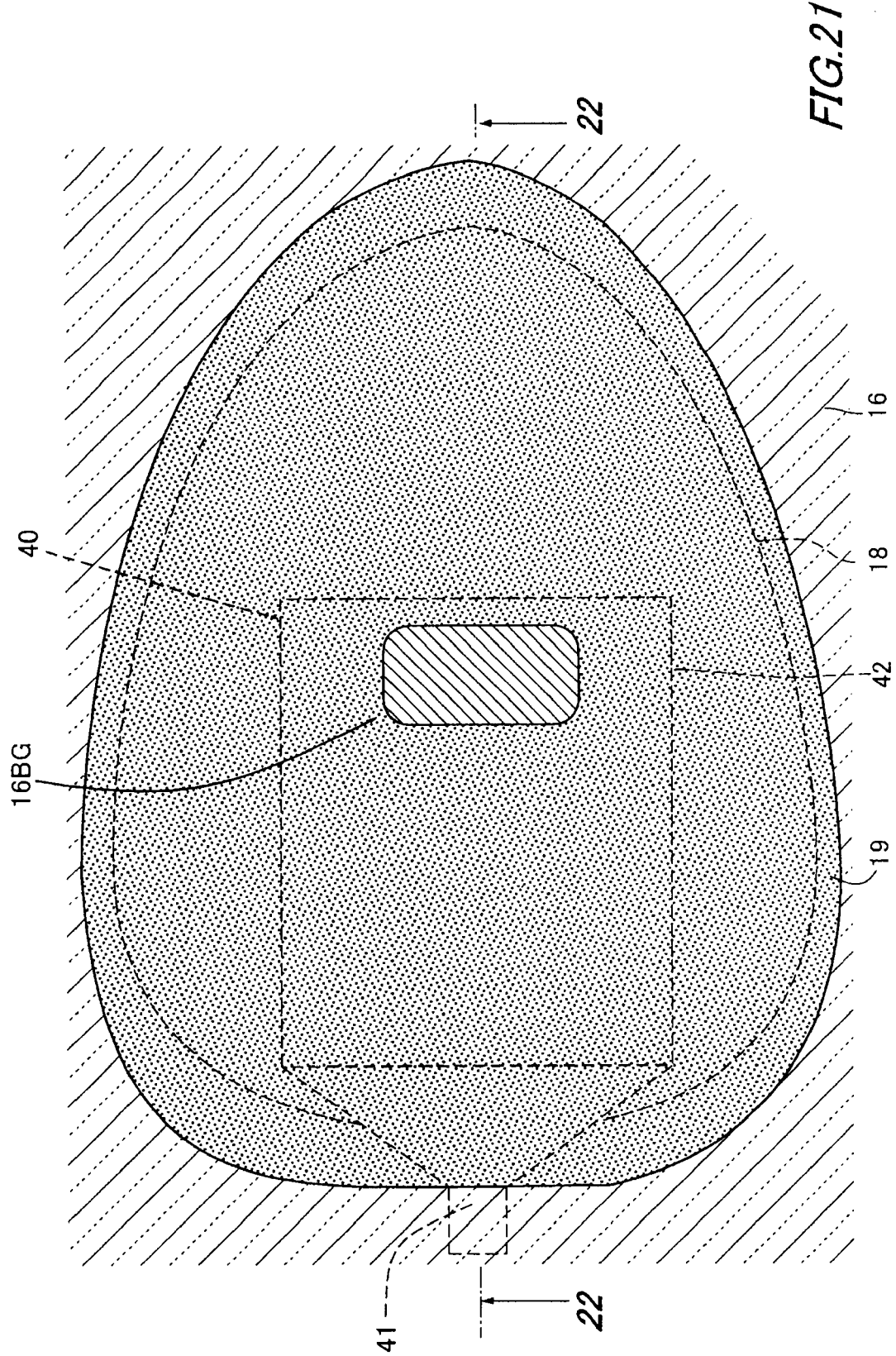
FIG. 21 is a plan view of a portion of the recording element, showing a step after the step shown in FIGS. 18 to 20.
Figure 22:
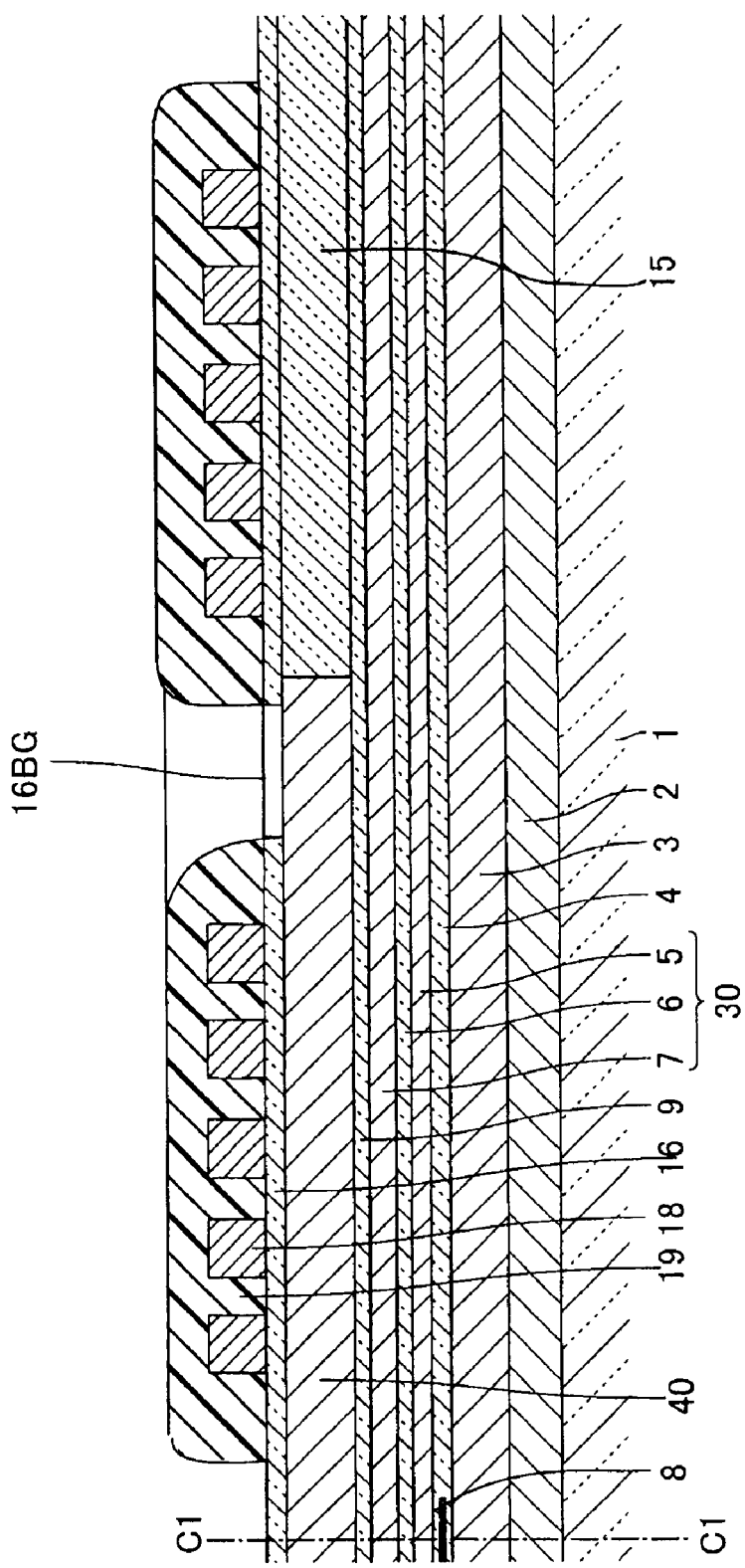
FIG. 22 is a cross-sectional view taken along line 22-22 in FIG. 21.

Then, the coil insulating film 19 covering the coil film 18 is formed by using a photolithography process or the like, as shown in FIGS. 21 and 22. The coil insulating film 19 is prevented from adhering to the back gap portion 16BG.

Figure 23:
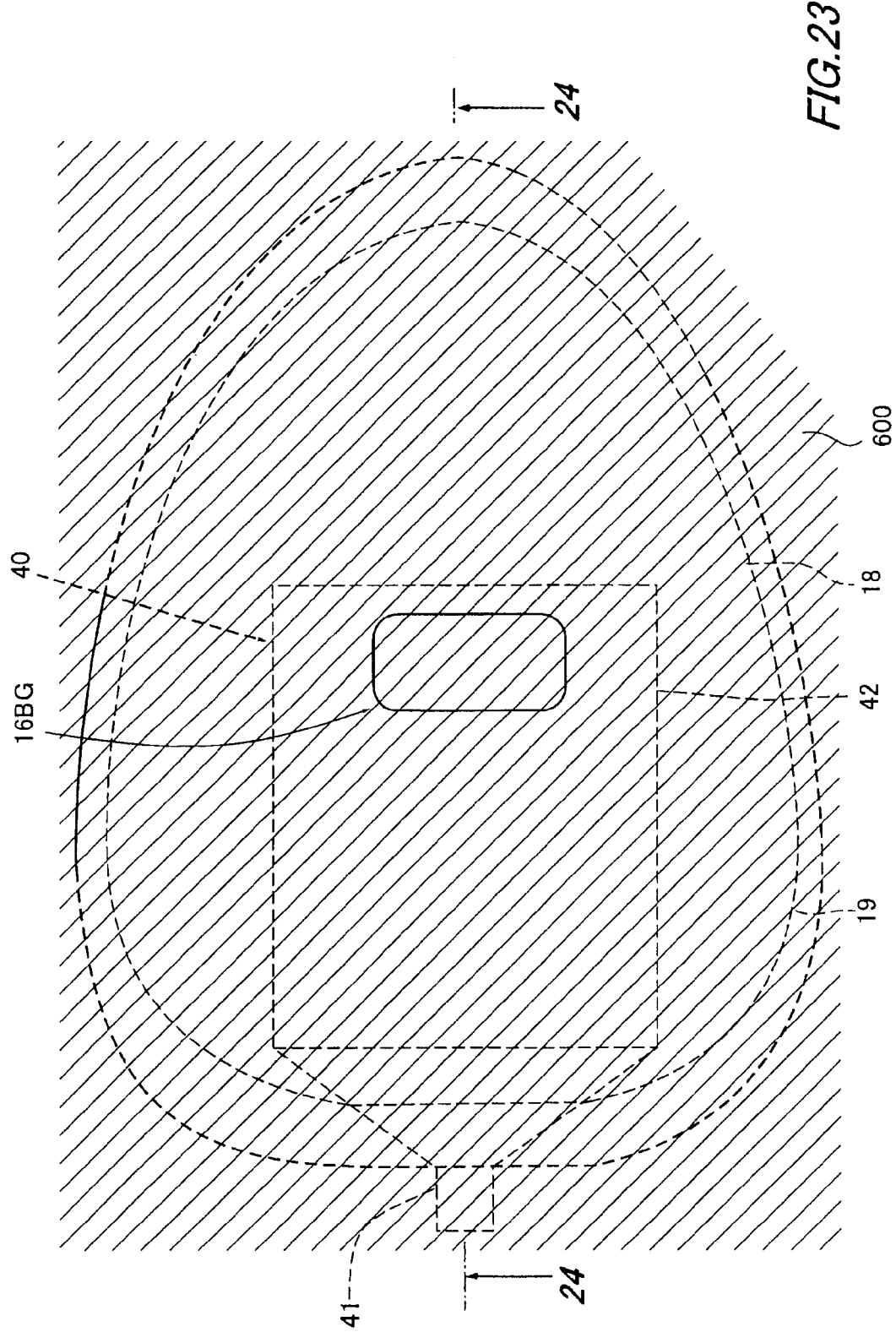
FIG. 23 is a plan view of a portion of the recording element, showing a step after the step shown in FIGS. 21 and 22.
Figure 24:
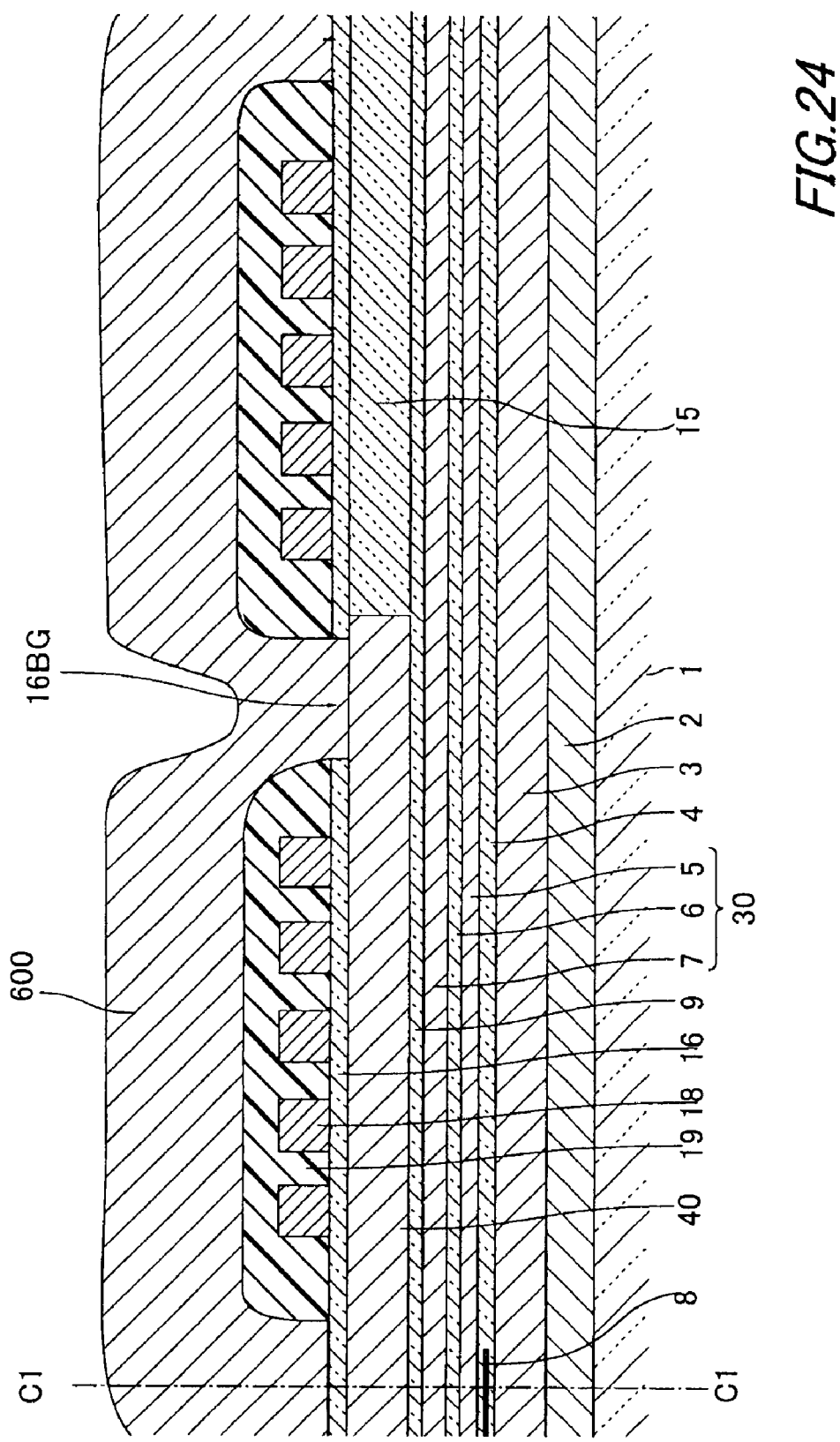
FIG. 24 is a cross-sectional view taken along line 24-24 in FIG. 23.

Then, by using a dry deposition process such as sputtering, a magnetic film 600 for forming the second magnetic film 60 is formed with a given thickness on the surface of the coil insulating film 19 and inside the back gap portion 16BG, as shown in FIGS. 23 and 24. With the above dry deposition process, the magnetic film 600 can be formed with excellent abrasion resistance as compared with plating. The line C1-C1 in FIG. 24 represents the final polishing position.

Figure 25:
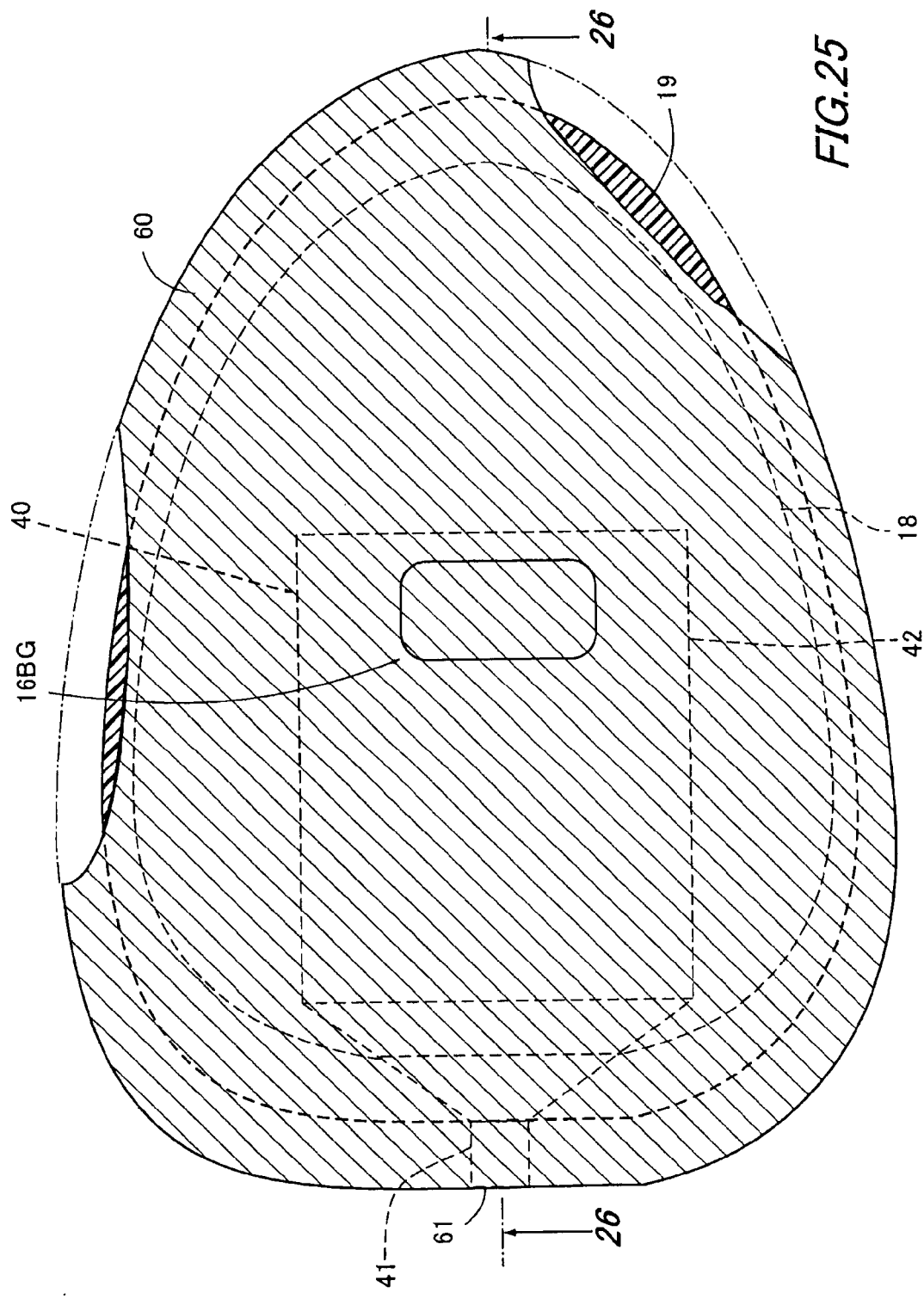
FIG. 25 is a plan view of a portion of the recording element, showing a step after the step shown in FIGS. 23 and 24.
Figure 26:
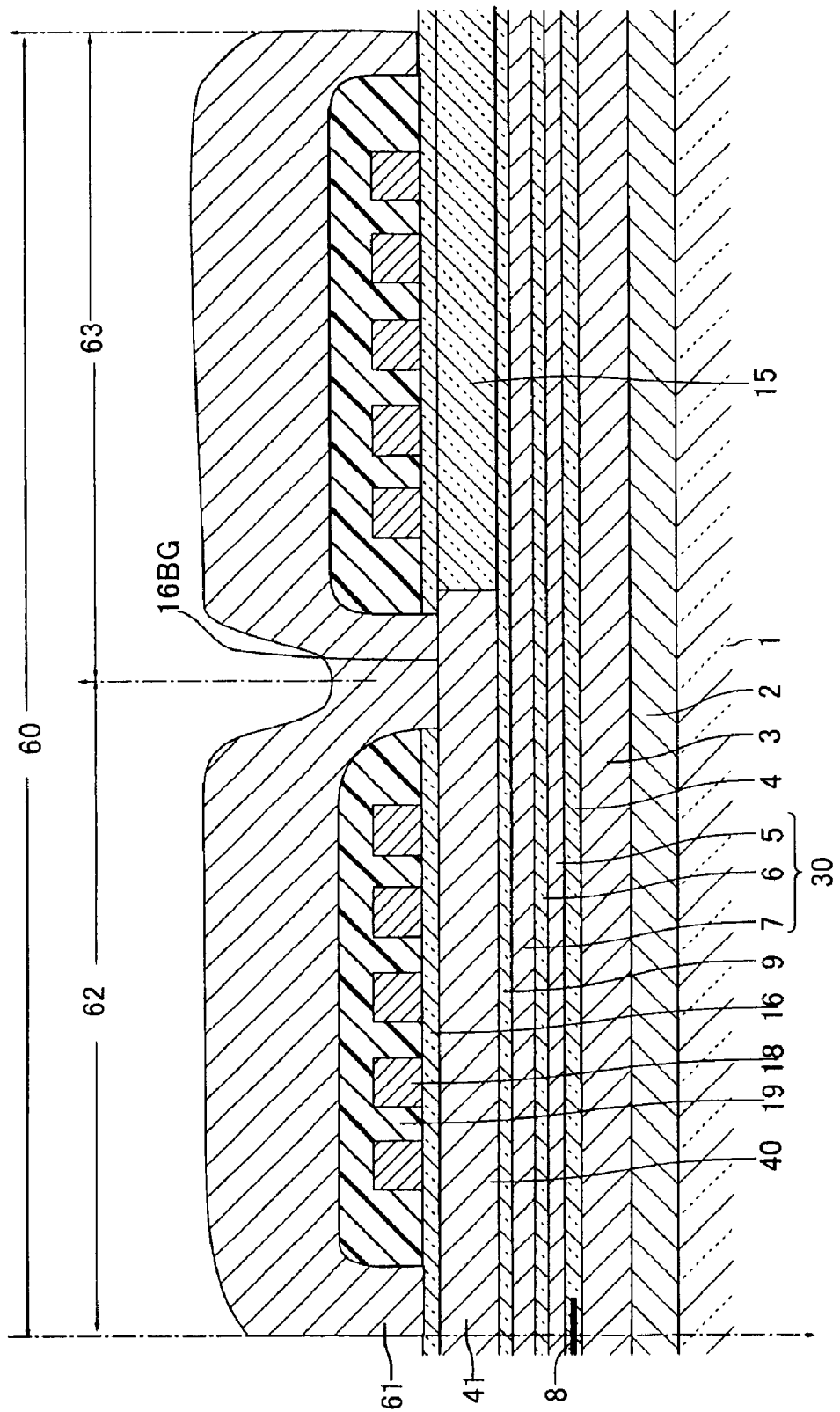
FIG. 26 is a cross-sectional view taken along line 26-26 in FIG. 25.

Then, by using a known dry etching process such as ion milling or RIE (reactive ion etching), the magnetic film 600 is etched in an area outside the coil insulating film 19. With this, the second magnetic film 60, which covers the entire surface of the coil insulating film 19 and completely encircles the coil insulating film 19 with a given film thickness, can be formed as shown in FIGS. 25 and 26. As described above, the dry etching process is performed in an area outside the coil insulating film 19. In the dry etching process, accordingly, dry etching is prevented from advancing to the coil insulating film 19 underlying the second magnetic film 60. Thus, the thickness of the coil insulating film 19 can be reduced to bring the second magnetic film 60 closer to the coil film 18, thereby improving the electromagnetic characteristic. Thereafter, the non-magnetic film 21 covering the second magnetic film 60 and its surrounding area is formed by using sputtering.

Next will be described a plating deposition method.

Figure 27:
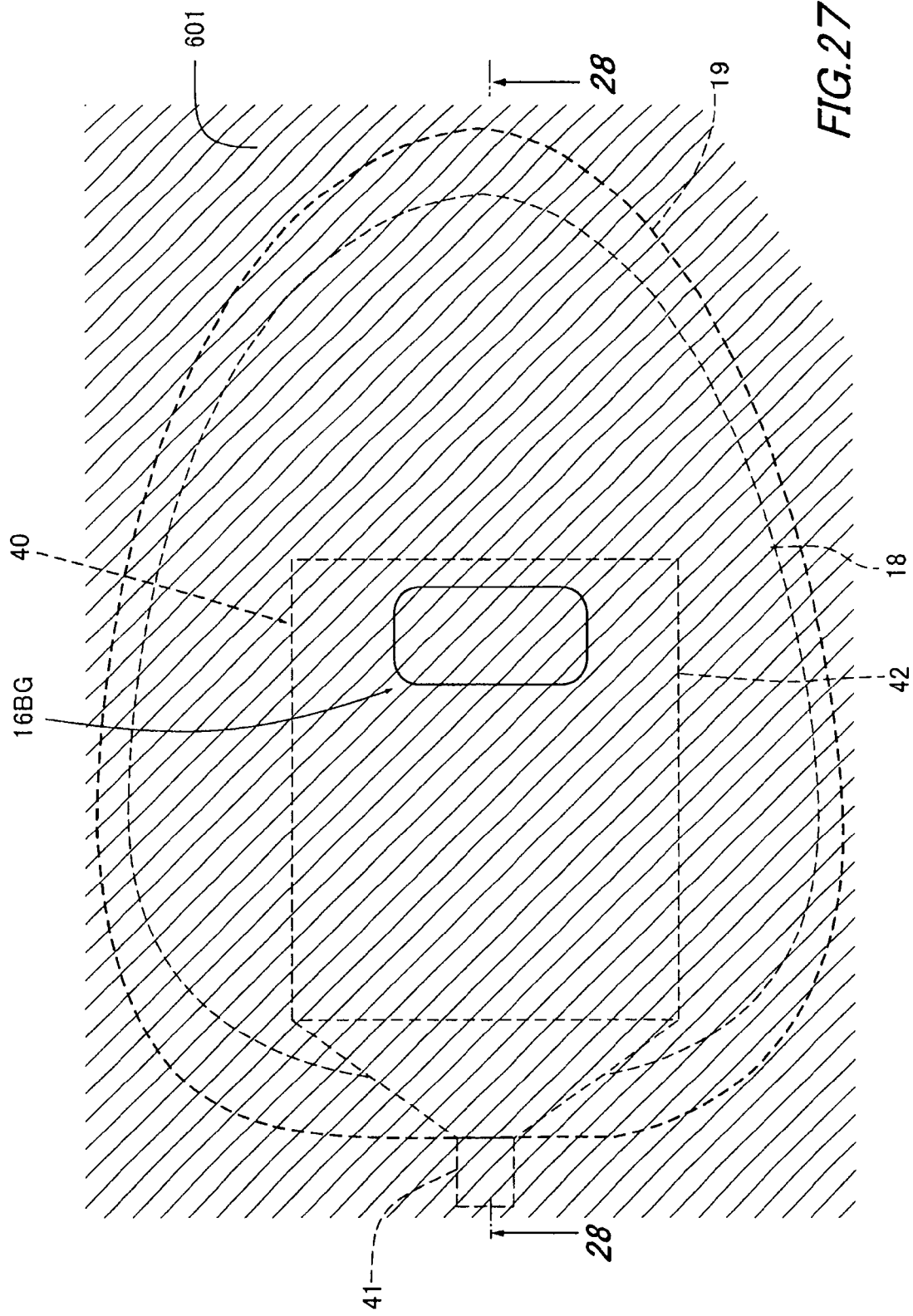
FIG. 27 is a plan view of a portion of the recording element, showing another embodiment of a magnetic head manufacturing method according to the present invention.
Figure 28:
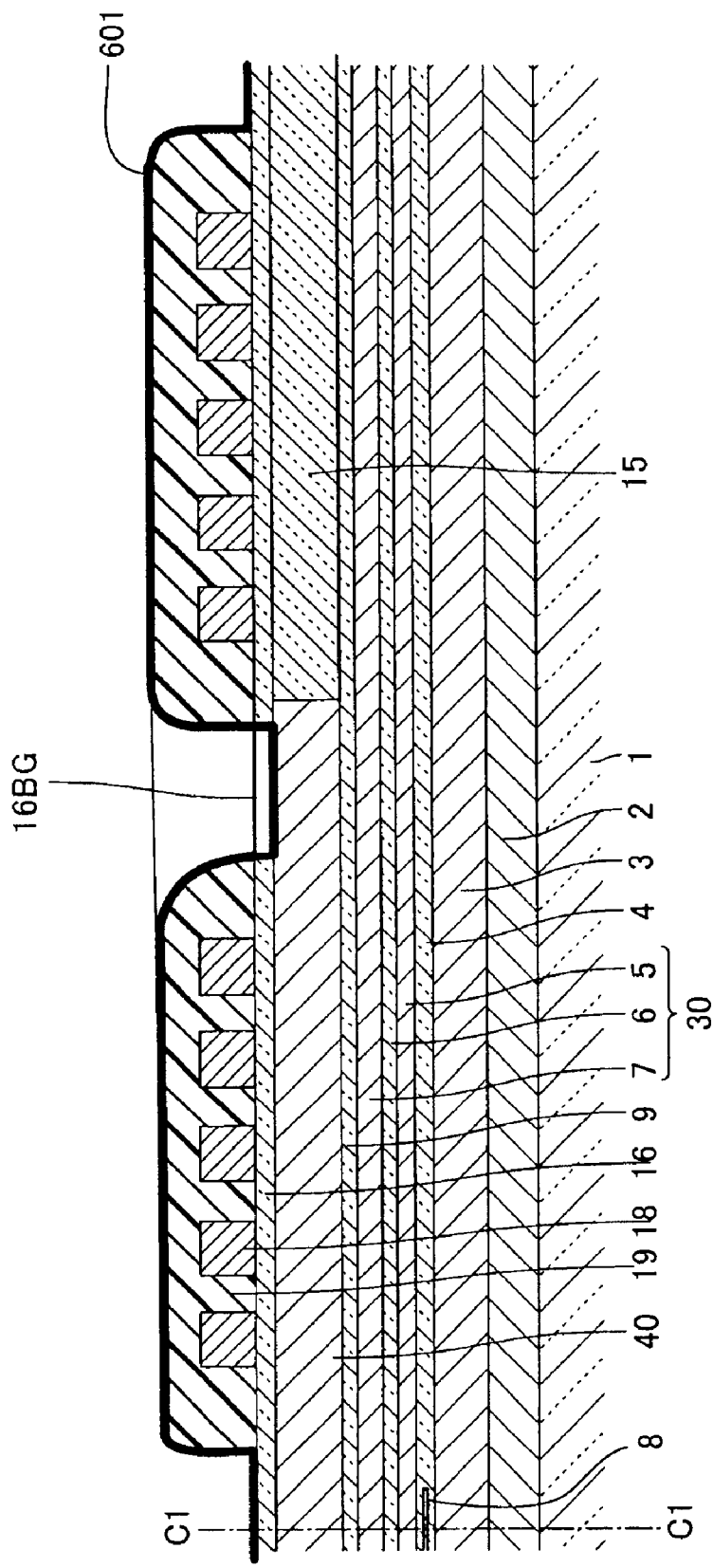
FIG. 28 is a cross-sectional view taken along line 28-28 in FIG. 27.

At first, after the steps of FIGS. 12 to 22, a plating undercoat film 601 is formed over the entire surface of the coil insulating film 19 and its surrounding area, as shown in FIGS. 27 and 28, by using a dry deposition process such as sputtering.

Figure 29:
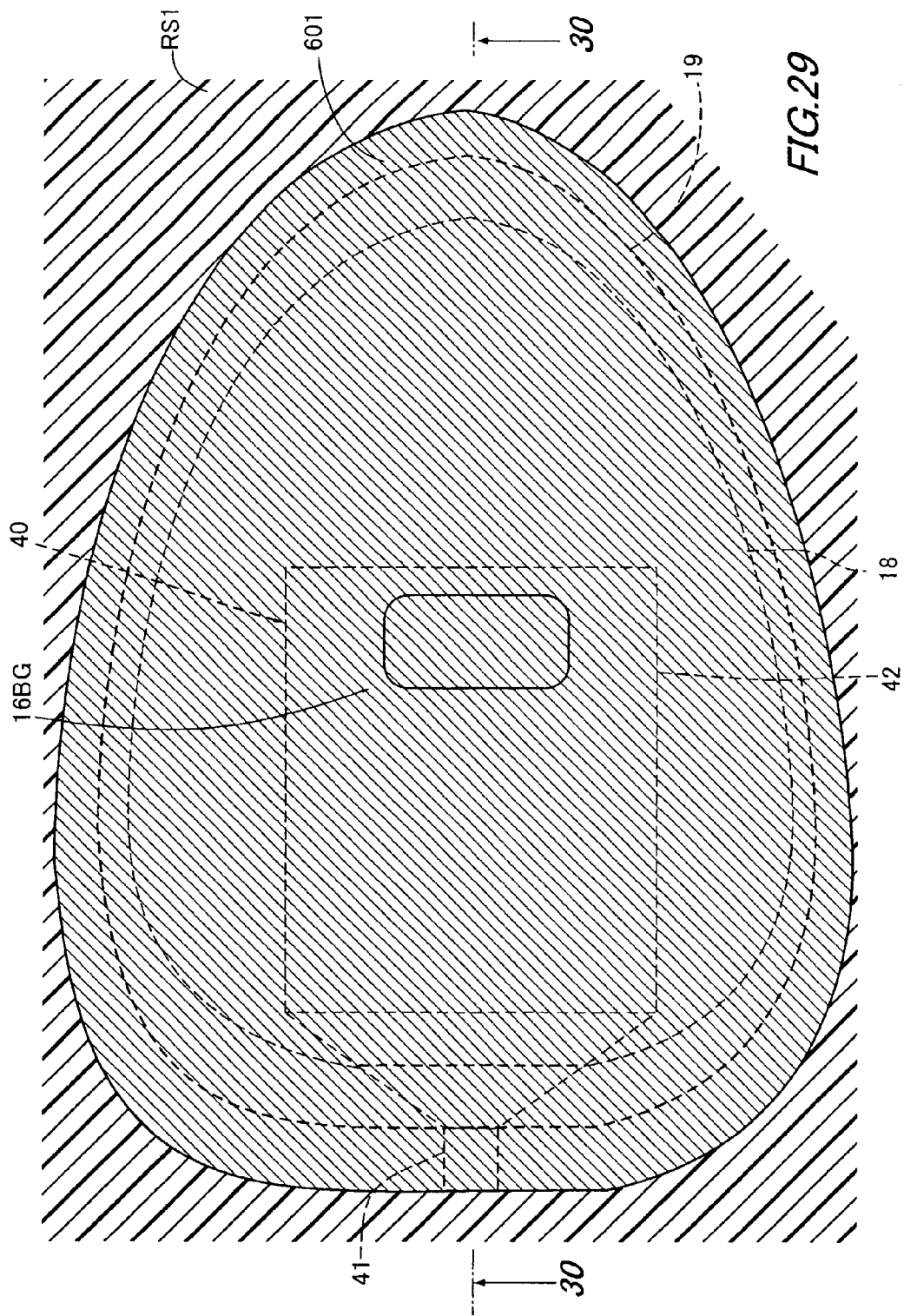
FIG. 29 is a plan view of a portion of the recording element, showing a step after the step shown in FIGS. 27 and 28.
Figure 30:
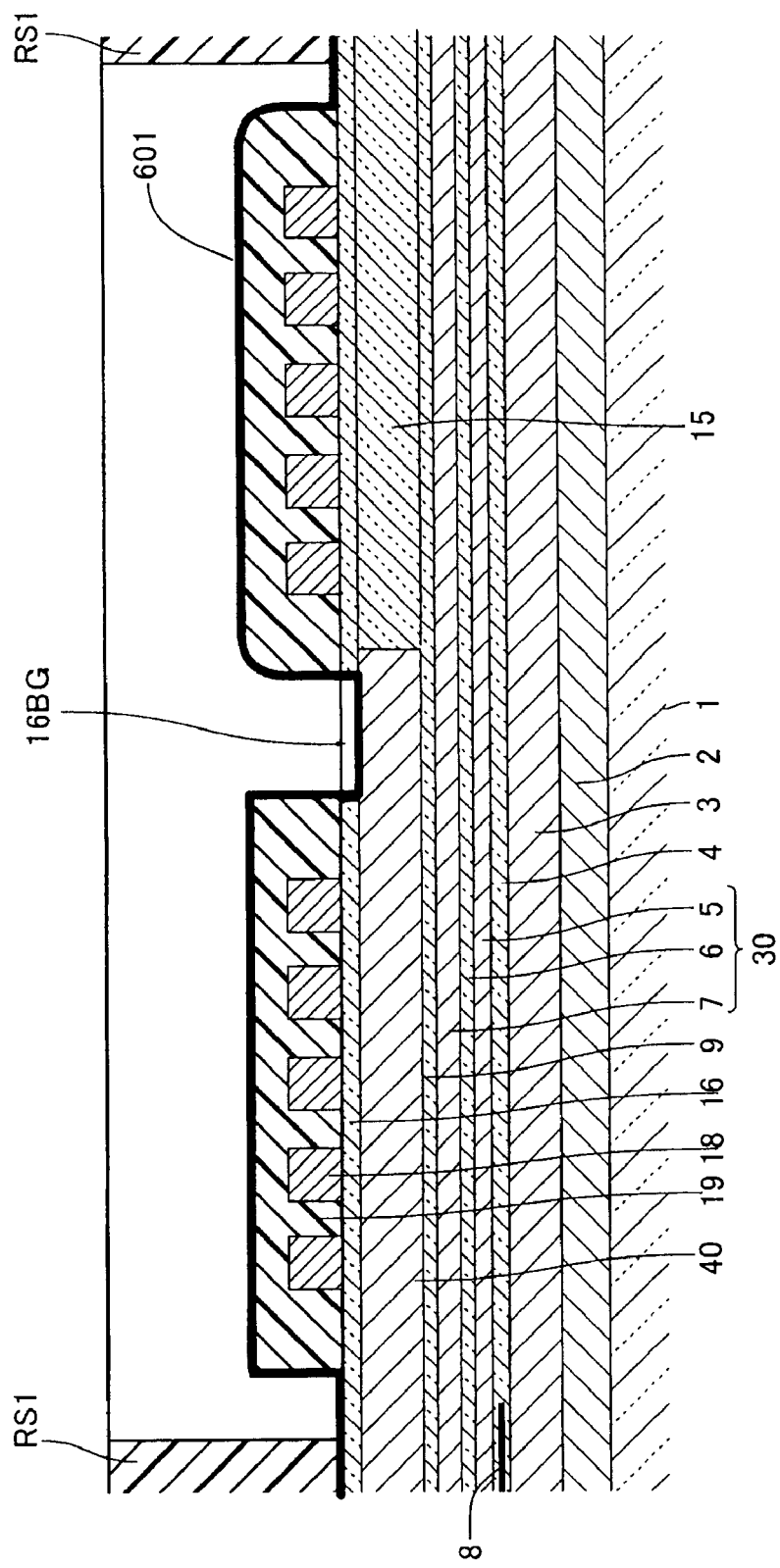
FIG. 30 is a cross-sectional view taken along line 30-30 in FIG. 29.

Then, a resist frame RS1 corresponding to the pattern of the second magnetic film is formed by using a known photolithography process, as shown in FIGS. 29 and 30. The resist frame RS1 is formed such that its inner periphery is spaced apart from the outer periphery of the coil insulating film 19. Inside the area surrounded by the resist frame RS1, the plating undercoat film 601 is exposed.

Figure 31:
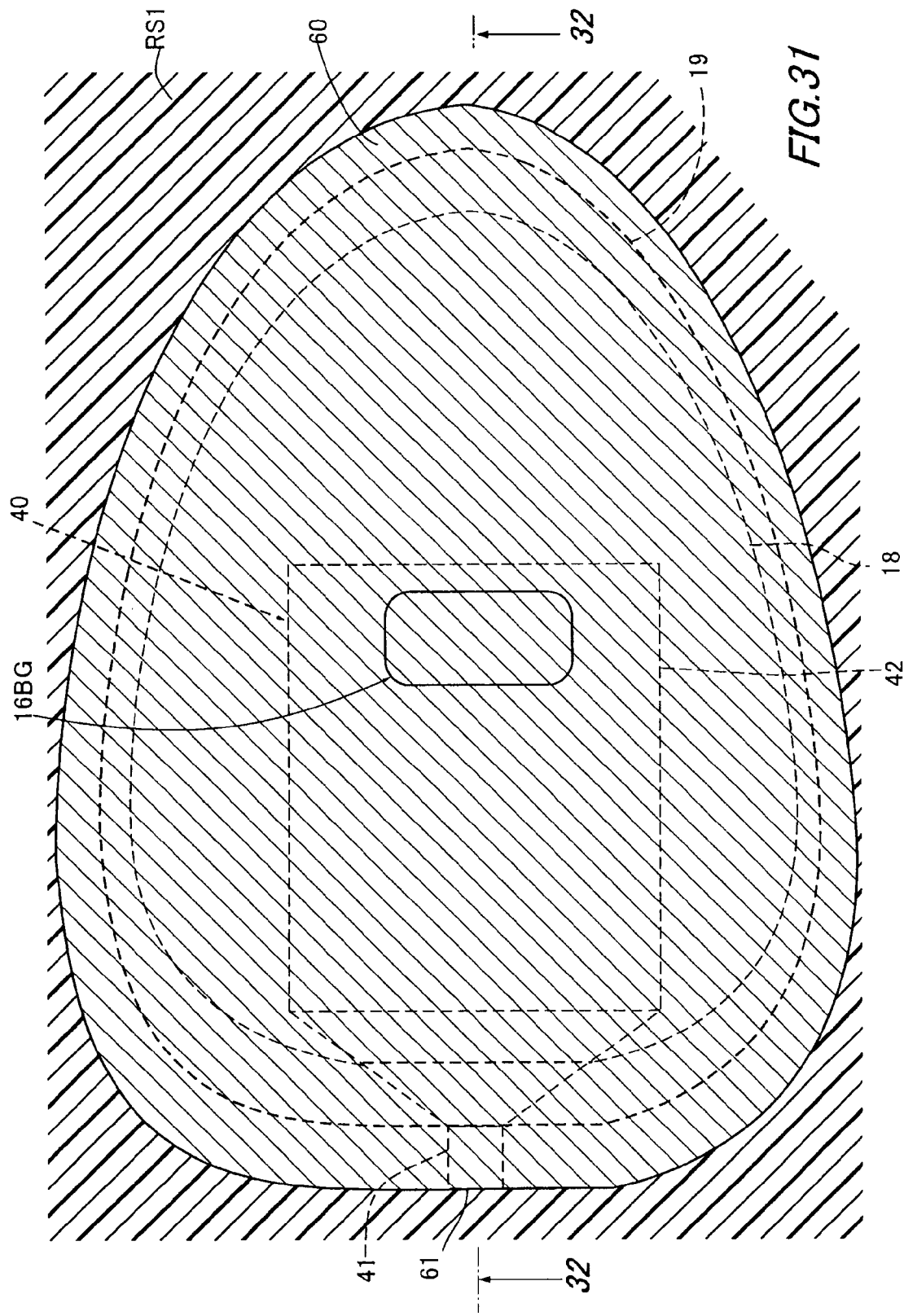
FIG. 31 is a plan view of a portion of the recording element, showing a step after the step shown in FIGS. 29 and 30.
Figure 32:
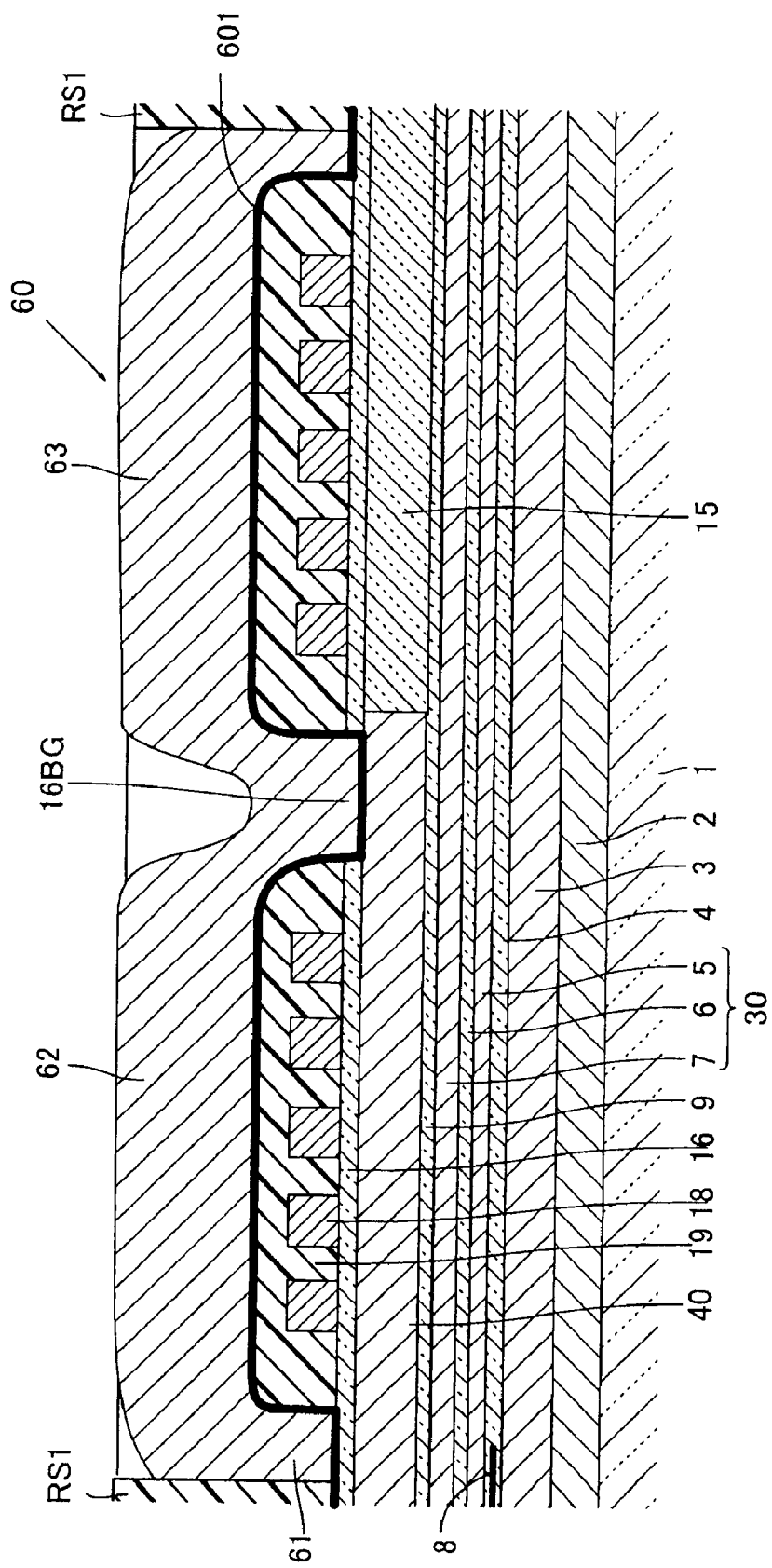
FIG. 32 is a cross-sectional view taken along line 32-32 in FIG. 31.

Then, electroplating is performed with the plating undercoat film 601 taken as an electrode, as shown in FIGS. 31 and 32. Thus, the second magnetic film 60 is plated on the area surrounded by the resist frame 601. Since the resist frame RS1 is formed such that its inner periphery is spaced apart from the outer periphery of the coil insulating film 19 and the plating undercoat film 601 is exposed inside the area surrounded by the resist frame RS1, the deposited second magnetic film 60 covers the entire surface of the coil insulating film 19 and completely encircles the coil insulating film 19 with a given film thickness.

Figure 33:
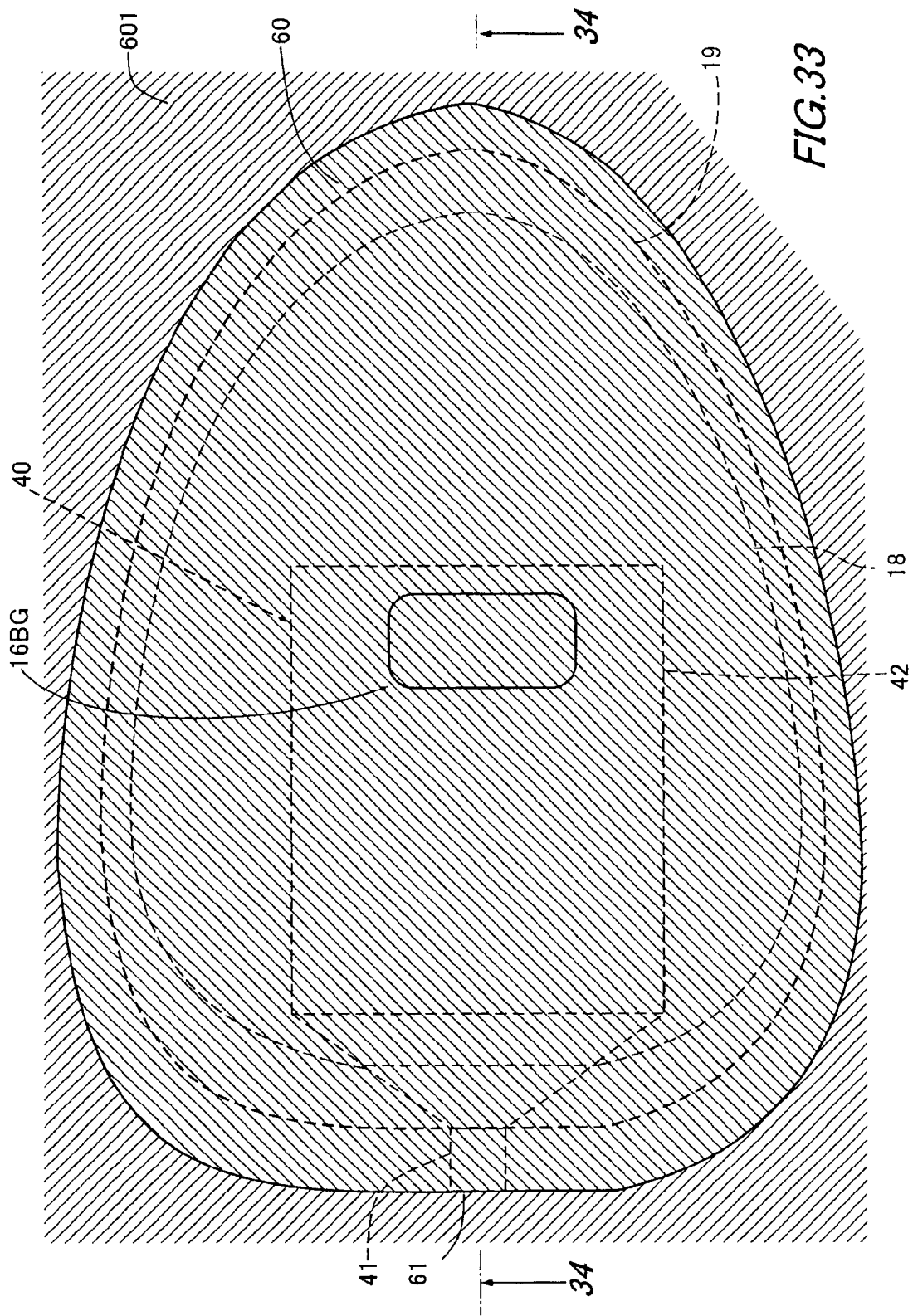
FIG. 33 is a plan view of a portion of the recording element, showing a step after the step shown in FIGS. 31 and 32.
Figure 34:
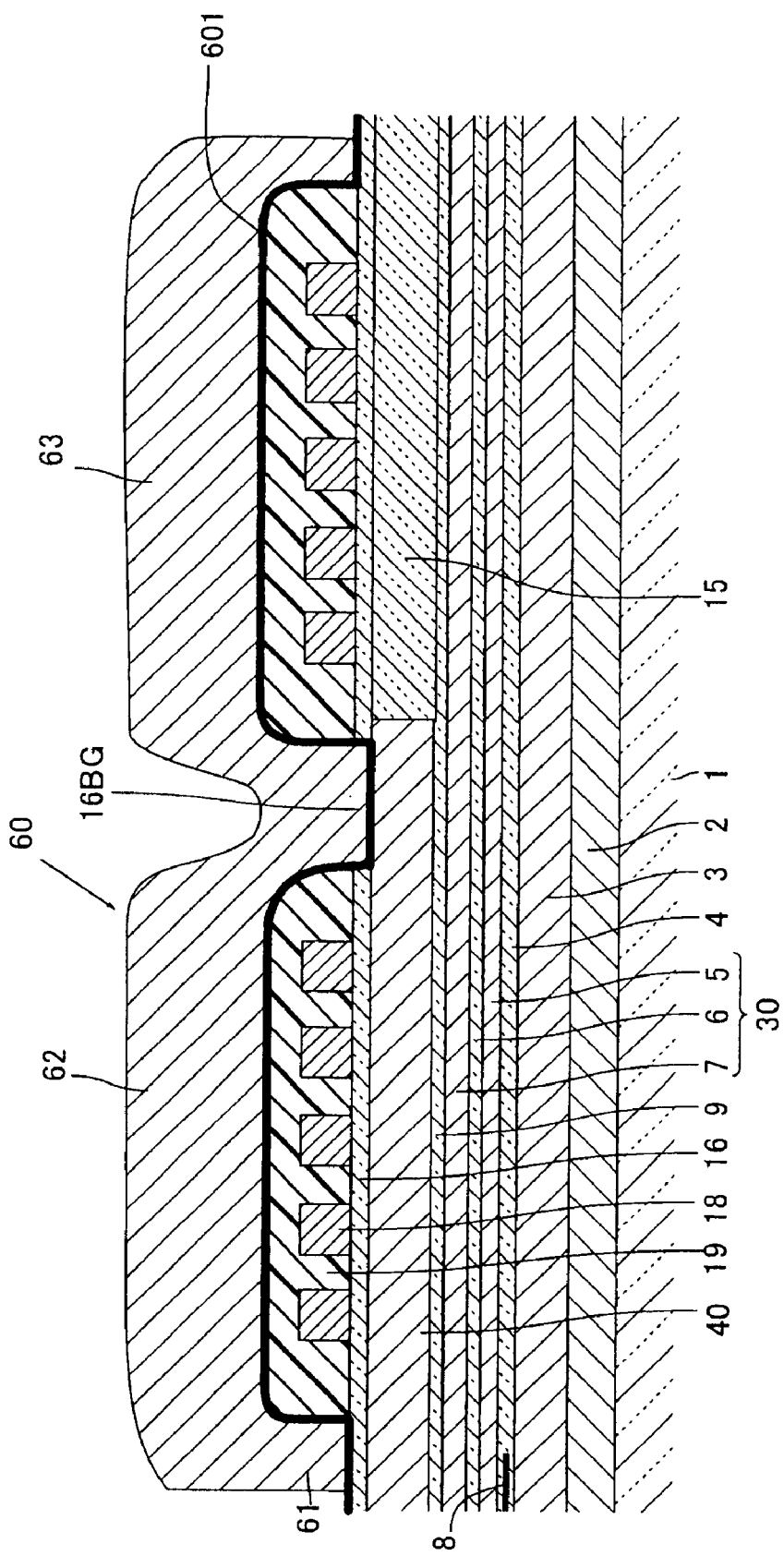
FIG. 34 is a cross-sectional view taken along line 34-34 in FIG. 33.

Then, the resist frame RS1 is removed by wet etching (chemical etching). With this, the plating undercoat film 601 appears outside the second magnetic film 60, as shown in FIGS. 33 and 34. The plating undercoat film 601 appearing outside the second magnetic film 60 is unnecessary and therefore has to be removed.

Figure 35:
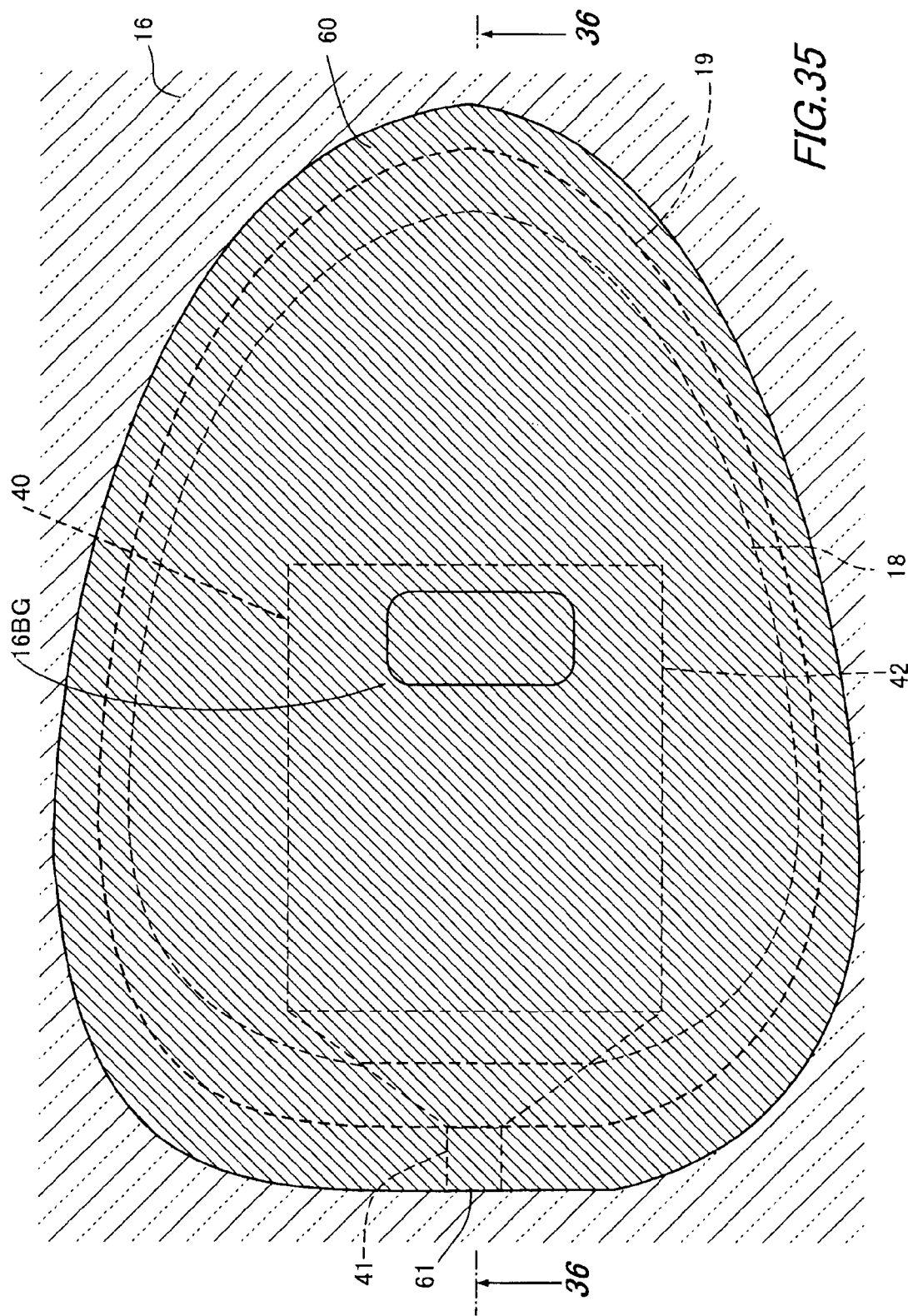
FIG. 35 is a plan view of a portion of the recording element, showing a step after the configuration shown in FIGS. 33 and 34.
Figure 36:
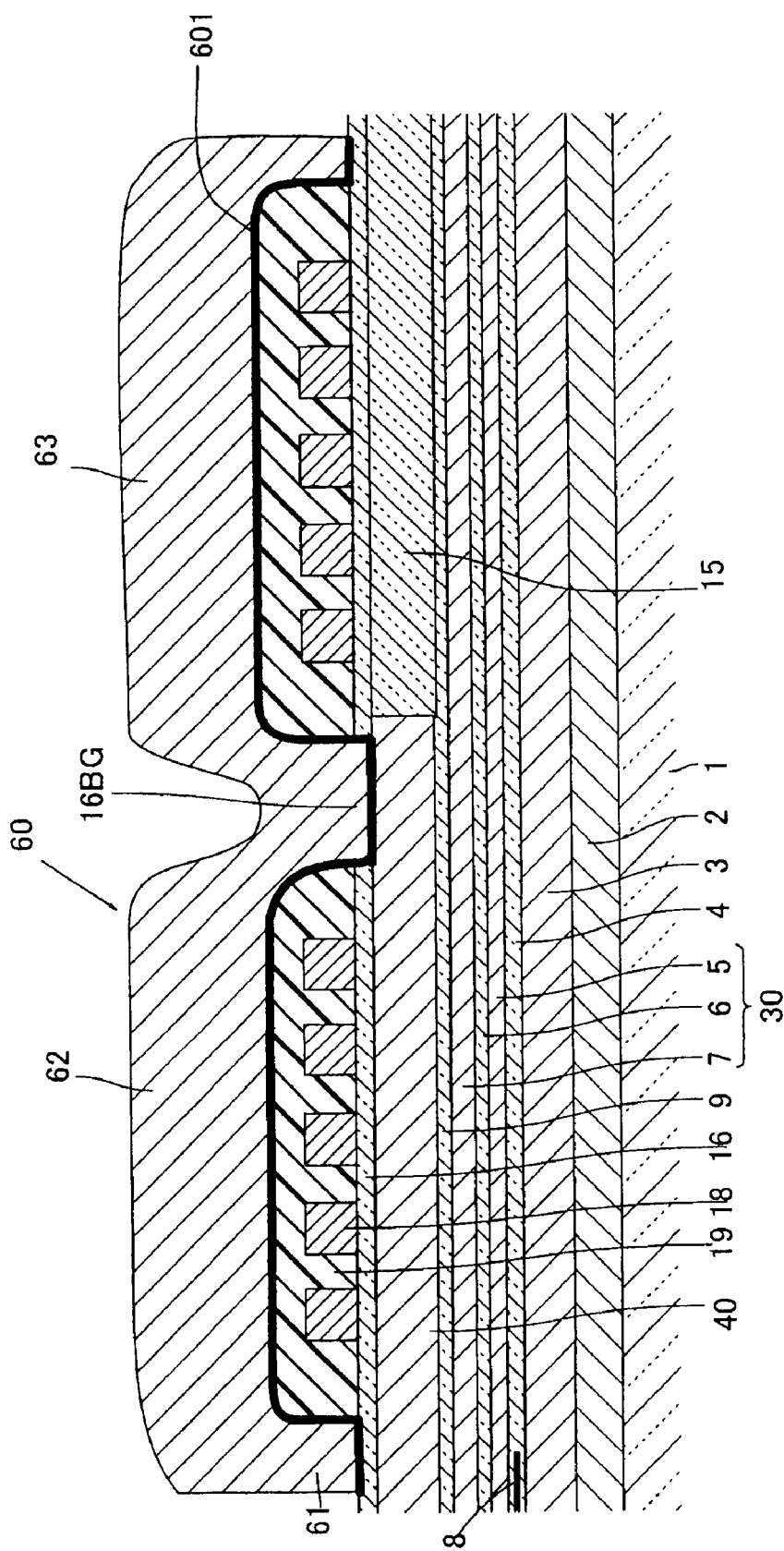
FIG. 36 is a cross-sectional view taken along line 36-36 in FIG. 35.

In order to remove the plating undercoat film 601, accordingly, a dry etching process such as ion milling or RIE is performed to remove the plating undercoat film 601 appearing outside the second magnetic film 60. With this, the magnetic gap film 16, which has been located beneath the removed plating undercoat film 601, appears as shown in FIGS. 35, 36, so that the second magnetic film 60, which covers the entire surface of the coil insulating film 19 and completely encircles the coil insulating film 19 with a given film thickness, can be formed within its plane.

As described above, the dry etching process for removing the plating undercoat film 601 is performed in an area outside the coil insulating film 19. In the dry etching process, accordingly, dry etching is prevented from advancing to the coil insulating film 19 underlying the second magnetic film 60. Thus, the thickness of the coil insulating film 19 can be reduced to bring the second magnetic film 60 closer to the coil film 18, thereby improving the electromagnetic characteristic. Thereafter, the non-magnetic film 21 covering the second magnetic film 60 and its surrounding area is formed by using sputtering.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising a recording element, said recording element including a first magnetic film, a second magnetic film, a coil film, and a coil insulating film, wherein
    said first magnetic film has a first pole portion,
    said second magnetic film has a second pole portion opposed to said first pole portion with a magnetic gap film therebetween and is joined to said first magnetic film at a back gap portion that is located in a rearward position with respect to a medium facing surface,
    said coil film extends around said back gap portion,
    said coil insulating film encloses said coil film, and moreover
    said second magnetic film entirely covers and completely encircles said coil insulating film with a given thickness at a peripheral area of the coil insulating film.

2. The magnetic head of claim 1, wherein said second magnetic film is a sputtered film.

3. The magnetic head of claim 1, wherein said second magnetic film is such that said second pole portion has a larger track direction width than said first pole portion.

4. The magnetic head of claim 1, further including a reproducing element.

5. The magnetic head of claim 4, including a slider, wherein said recording and reproducing elements are supported by said slider.

6. The magnetic head of claim 4, including a plurality of units of said recording and reproducing elements, wherein individual units are arranged at intervals in one direction.

7. A head assembly comprising a magnetic head and a head support device, wherein
    said magnetic head is according to claim 5,
    said head support device supports said magnetic head in such a manner as to permit rolling and pitching of said magnetic head.

8. A magnetic recording/reproducing apparatus comprising a head assembly and a magnetic recording medium, wherein
    said assembly is according to claim 7 and adapted to write data on said magnetic recording medium with said recording element of said magnetic head and read data from said magnetic recording medium with said reproducing element of said magnetic head.

9. A magnetic recording/reproducing apparatus comprising a magnetic tape driving means, a magnetic tape, and a magnetic head, wherein
    said magnetic tape driving means is adapted to run a magnetic tape along a tape running direction,
    said magnetic head is according to claim 6 and has a tape bearing surface, and
    said tape bearing surface is adapted to be brought into sliding contact with said magnetic tape for writing data on said magnetic tape with said recording element and reading data from said magnetic tape with said reproducing element.

10. A method for manufacturing a magnetic head, said magnetic head comprising a recording element, said recording element including a first magnetic film, a second magnetic film, a coil film, and a coil insulating film, wherein
    said first magnetic film has a first pole portion exposed on a medium facing surface,
    said second magnetic film has a second pole portion opposed to said first pole portion with a magnetic gap film therebetween and is joined to said first magnetic film at a back gap portion that is located in a rearward position with respect to said medium facing surface,
    said coil film extends around said back gap portion,
    said coil insulating film encloses said coil film, and
    said second magnetic film entirely covers and completely encircles said coil insulating film with a given thickness at a peripheral area of the coil insulating film, wherein
    when manufacturing said magnetic head, the method comprises the steps of:
    forming a magnetic film by sputtering over an entire surface including a surface of said coil insulating film after formation of said first magnetic film, said coil film, and said coil insulating film; and
    then dry etching said magnetic film outside an area of said coil insulating film to form said second magnetic film, which entirely covers said coil insulating film.

11. A method for manufacturing a magnetic head, said magnetic head comprising a recording element, said recording element including a first magnetic film, a second magnetic film, a coil film, and a coil insulating film, wherein
    said first magnetic film has a first pole portion exposed on a medium facing surface,
    said second magnetic film has a second pole portion opposed to said first pole portion with a magnetic gap film therebetween and is joined to said first magnetic film at a back gap portion that is located in a rearward position with respect to said medium facing surface,
    said coil film extends around said back gap portion,
    said coil insulating film encloses said coil film, and
    said second magnetic film entirely covers and completely encircles said coil insulating film with a given thickness at a peripheral area of the coil insulating film, wherein
    when manufacturing said magnetic head, the method comprises the steps of:
    forming a plating undercoat film over an entire surface including a surface of said coil insulating film after formation of said first magnetic film, said coil film, and said coil insulating film;
    then forming said second magnetic film in a pattern which entirely covers said coil insulating film by using a frame plating process; and
    then dry etching said plating undercoat film outside said coil insulating film.

* * * * *